(12) United States Patent
Annema et al.

(10) Patent No.: US 9,883,680 B2
(45) Date of Patent: Feb. 6, 2018

(54) METHOD AND SYSTEM FOR PROCESSING A DEFEATHERED WHOLE LEG POULTRY PRODUCT

(71) Applicant: MAREL STORK POULTRY PROCESSING B.V., Boxmeer (NL)

(72) Inventors: Heinze Annema, Gemert (NL); Richard Gerard Johan Drabbels, Venray (NL); Roger Pierre Hubertus Maria Claessens, Nijmegen (NL); Stefan Christianus Wilhelmus Martinus Van Den Heuvel, Oeffelt (NL); Pascal Peter André Van Kempen, Boxmeer (NL); Jan Willem Bos, Haps (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 0 days.

(21) Appl. No.: 15/319,708

(22) PCT Filed: Jun. 11, 2015

(86) PCT No.: PCT/NL2015/050431
§ 371 (c)(1),
(2) Date: Dec. 16, 2016

(87) PCT Pub. No.: WO2015/194946
PCT Pub. Date: Dec. 23, 2015

(65) Prior Publication Data
US 2017/0172165 A1 Jun. 22, 2017

(30) Foreign Application Priority Data

Jun. 18, 2014 (NL) .................................... 2013017
Jun. 18, 2014 (NL) .................................... 2013018
Jun. 18, 2014 (NL) .................................... 2013019

(51) Int. Cl.
*A22C 21/00* (2006.01)
(52) U.S. Cl.
CPC ...... *A22C 21/0092* (2013.01); *A22C 21/0023* (2013.01); *A22C 21/0053* (2013.01); *A22C 21/0076* (2013.01)

(58) Field of Classification Search
CPC .... A47J 43/0705; A47J 43/0755; A47J 42/04; B01F 13/002; B01F 7/164
(Continued)

(56) References Cited

U.S. PATENT DOCUMENTS 3,364,515 A   1/1968   Brown et al.
3,615,692 A   10/1971  Lovell
(Continued)

FOREIGN PATENT DOCUMENTS

EP   0 442 554 A1   8/1991
EP   0 763 326 A1   3/1997
(Continued)

*Primary Examiner* — Richard Price, Jr.
(74) *Attorney, Agent, or Firm* — Birch, Stewart, Kolasch & Birch, LLP

(57) ABSTRACT

The invention pertains to a method for processing a defeathered whole leg poultry product, wherein the method comprises the following steps: —providing a leg product which comprises: —a thigh, —a drumstick, —a knee joint, —while the leg product is suspended from a carrier of a conveyor, making a transverse cut at the knee joint, which transverse cut is made from the rear side of the leg product towards the knee cap, said cut having a cut end which is located adjacent to the rear of the knee cap so that the thigh and the drumstick remain connected to each other and the knee cap remains intact, by which cut a drumstick side cut plane and a thigh side cut plane are created, —while keeping the thigh meat and the drumstick connected to each other, removing the thigh bone from the thigh meat via the thigh side cut plane of the transverse cut, —while keeping the (Continued)

Figure 1:
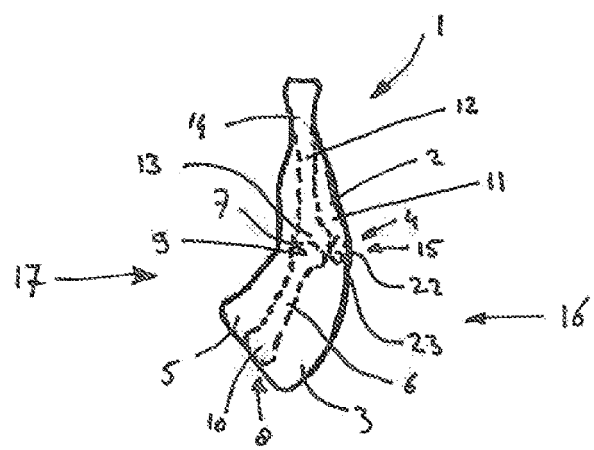

thigh meat and the drumstick connected to each other, severing the knee meat from the knee cap while keeping the knee meat and the thigh meat connected to each other, and subsequently severing the still interconnected knee meat and thigh meat from the drumstick.

25 Claims, 16 Drawing Sheets

(58) Field of Classification Search
USPC ... 452/52, 53, 106, 107, 135, 136, 149–153, 452/166, 167, 169, 170, 177, 180
See application file for complete search history.

(56) References Cited

U.S. PATENT DOCUMENTS

| | | | |
|---|---|---|---|
| 4,993,113 A | 2/1991 | Hazenbroek | |
| 5,015,213 A * | 5/1991 | Hazenbroek | A22C 21/0023 452/149 |
| 5,173,077 A * | 12/1992 | van den Nieuwelaar | A22B 5/0058 452/135 |
| 5,176,562 A | 1/1993 | Martin et al. | |
| 5,228,881 A | 7/1993 | Sekiguchi | |
| 5,713,787 A * | 2/1998 | Schoenmakers | A22C 17/004 452/136 |
| 5,961,383 A * | 10/1999 | Janssen | A22C 21/0076 452/135 |
| 5,976,004 A * | 11/1999 | Hazenbroek | A22C 21/0084 452/136 |
| 6,322,438 B1 * | 11/2001 | Barendregt | A22C 21/0023 452/155 |
| 7,232,365 B2 * | 6/2007 | Annema | A22C 21/0084 452/167 |
| 8,277,294 B2 * | 10/2012 | Van Hillo | A22C 21/0076 452/148 |
| 8,961,274 B1 * | 2/2015 | den Boer | A22C 21/066 452/148 |

FOREIGN PATENT DOCUMENTS

| | | |
|---|---|---|
| EP | 1 639 898 A1 | 3/2006 |
| JP | 2-283236 A | 11/1990 |
| WO | WO 00/59311 A2 | 10/2000 |
| WO | WO 03/039262 A2 | 5/2003 |

* cited by examiner

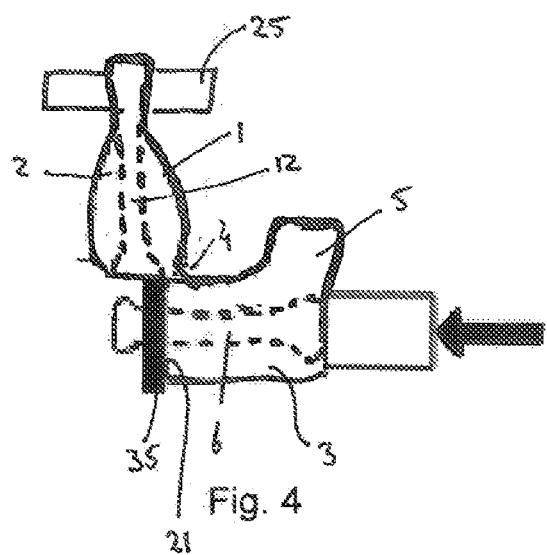
Fig. 4
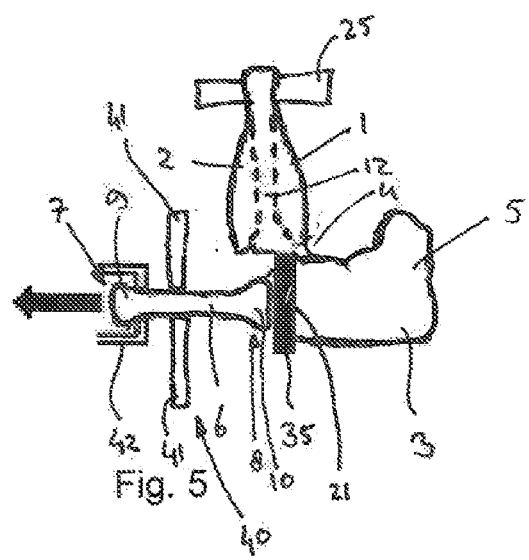
Fig. 5
Fig. 6

METHOD AND SYSTEM FOR PROCESSING A DEFEATHERED WHOLE LEG POULTRY PRODUCT

The invention pertains to a method and system for processing a defeathered whole leg poultry product.

In the art of poultry processing, the combination of a poultry drumstick and poultry thigh is called a "whole leg poultry product", even though the part of the leg from the tarsal joint to the foot and the foot itself generally have already been removed. Defeathered whole leg poultry products are sometimes as a whole sold to consumers, but often they are processed further, e.g. to drumsticks and thighs or boneless thigh meat.

Poultry thigh meat is a generally high quality, tasty meat type that is highly valued by consumers. With the increased popularity of this type of poultry meat, the demand for boneless poultry thigh meat or otherwise processed poultry thighs also increases.

Poultry drumsticks are also popular poultry products. They are tasty, easy to prepare and due to their size they make popular food items.

WO00/59311 discloses several processes that can be carried out on a defeathered whole leg poultry product, such as removing skin, severing the drumstick and the thigh from each other and removing the thigh bone from a defeathered whole leg poultry product.

WO00/59311 discloses two different methods of removing the thigh bone. In one method, a transverse cut is made at the knee joint, to sever the thigh bone and the drumstick bone from each other. Also, a longitudinal cut is made in the thigh meat, to expose the thigh bone. Then, the thigh bone is severed from the thigh meat between the knee joint and the hip joint end of the thigh bone by pulling the thigh bone sideways out of the thigh meat via the longitudinal cut in the thigh meat. During this pulling, the thigh meat remains connected to the hip side end of the thigh bone, so the thigh bone is more or less rotated about its hip side end. Then, as a final step, the connection between in the thigh meat and the thigh bone at the hip side end of the thigh bone is cut through.

It has been found that when carrying out this method, it is very hard to make the longitudinal cut in the thigh meat at the correct location without cutting into the drumstick as well. Cutting into the drumstick is generally undesired, as the drumsticks are desired to have undamaged skin and meat thereon. Also, the depth of the longitudinal cut in the thigh meat has to be very precise. If cut too deep, bone splinters may be found in the thigh meat and if cut too shallow, the thigh bone cannot be removed properly.

In the other method of removing the thigh bone that is disclosed in WO00/59311, the thigh meat is scraped off the thigh bone while the tibia bone (which is the bone in the drumstick) and the thigh bone remain connected to each other. During the scraping, relatively large forces are exerted on the connection between the drumstick or parts thereof and the thigh bone. Therefore, it sometimes happens that the connection between the drumstick bone and the thigh bone breaks during the scraping, in particular when the connection has been damaged already somewhat when the thigh meat and the drumstick meat were severed before the scraping started. If the connection between the drumstick bone and the thigh bone breaks during the scraping, the thigh bone will not be removed from the thigh meat.

If the thigh bone breaks and/or is not or not entirely removed this disrupts not only the thigh bone removal process, but also other processes that are carried out on the defeathered whole leg poultry product.

It is the object of the invention to provide an improved method and system for processing a defeathered whole leg poultry product.

In a first aspect of the invention, this object is achieved with a method for processing a defeathered whole leg poultry product, which method comprises the following steps:

providing a defeathered whole leg poultry product which comprises:
  a thigh, which thigh comprises at least a thigh bone and thigh meat, wherein the thigh bone has a knee side end and a hip side end,
  a drumstick, which drumstick comprises at least a tibia bone and drumstick meat, wherein the tibia bone has a knee side end and a tarsal joint side end,
  a knee joint, which knee joint comprises at least the knee cap, knee meat on said knee cap and a connection between the thigh and the drumstick,
  which defeathered whole leg poultry product has a front side, which is the side on which the knee cap is located, and a rear side, which is the side opposite to the front side,
arranging the defeathered whole leg poultry product in a poultry products conveyor comprising:
  a track,
  a plurality of poultry product carriers which are spaced apart from one another in the direction of the track and which are movable along said track, wherein each poultry product carrier is adapted to hold at least one defeathered whole leg poultry product at or adjacent to the tarsal joint side end thereof such that the defeathered whole leg poultry product is conveyed hanging from said poultry product carrier,
conveying the defeathered whole leg poultry product along said track in a direction of conveyance, with the defeathered whole leg poultry product being suspended from the carrier in which it is arranged, along which track a knee cutter device, a thigh bone remover device and a thigh meat and knee meat harvester device are provided,
while the defeathered whole leg poultry product is suspended from the carrier, making a transverse cut at the knee joint using the knee cutter device, which transverse cut is made from the rear side of the defeathered whole leg poultry product towards the knee cap, which transverse cut extends generally in a direction transverse to the thigh bone and the tibia bone, said transverse cut having a cut end which is located adjacent to the rear side of the knee cap so that the thigh and the drumstick remain connected to each other and the knee cap remains intact, by which transverse cut a drumstick side cut plane and a thigh side cut plane are created,
while keeping the thigh meat and the drumstick connected to each other, removing the thigh bone from the thigh meat via the thigh side cut plane of the transverse cut in the knee joint by using the thigh bone remover device,
while keeping the thigh meat and the drumstick connected to each other, severing the knee meat from the knee cap while keeping the knee meat and the thigh meat connected to each other by using the thigh meat and knee meat harvester device, and subsequently severing the still interconnected knee meat and thigh meat from the drumstick.

The poultry product that is processed in accordance with the method according to the invention, and therewith forms the input for the method according to the invention, is a defeathered whole leg poultry product which comprises a thigh, a drumstick and a knee joint. In practical embodiments, usually the leg part between the tarsal joint and the foot as well as the foot itself have already been removed.

The thigh comprises at least a thigh bone and thigh meat. The thigh bone has a knee side end and a hip side end.

Optionally, a knee side condyle is present at the knee side end of the thigh bone.

Optionally, the thigh bone may still comprise a hip side condyle, or the hip side condyle may have been removed either intentionally or unintentionally. If the hip side condyle is still present, the diameter of the thigh bone at the hip side end will be larger than the diameter of the thigh bone between the knee side condyle and the hip side condyle, as the thigh bone is thicker at the condyles than between the condyles.

If no hip side condyle is present, this means that the hip side condyle has been removed from the thigh bone. This can be done intentionally, e.g. as a consequence of the choses way to separate the defeathered whole leg poultry product from the rest of the poultry carcass, on unintentionally, e.g. by breaking it off during transport or storage. If no hip side condyle is present any more, the diameter of the thigh bone at the hip side end will be similar to the diameter of the thigh bone just behind the knee side condyle.

The "region of the thigh bone between the knee side condyle and the hip side condyle" is a part of the "region of the thigh bone between the knee side condyle and the hip side end" if a hip side condyle is present.

The drumstick comprises at least a tibia bone and drumstick meat. The tibia bone has a knee side end and a tarsal joint side end.

The knee joint comprises at least the knee cap, knee meat on said knee cap and a connection between the thigh and the drumstick.

The defeathered whole leg product has a front side, which is the side on which the knee cap is located, and a rear side, which is the side opposite to the front side.

The defeathered whole leg poultry product is further sometimes in this application referred to as "the leg product" for easier reading. "The leg product" is the same as "the defeathered whole leg poultry product".

In accordance with the method according to the first aspect of the invention, the leg product is arranged in a poultry products conveyor. The poultry products conveyor comprises a track and a plurality of poultry product carriers. The poultry product carriers are spaced apart from one another in the direction of the track. They are movable along the track. Each poultry product carrier is adapted to hold at least one leg product at or adjacent to the tarsal joint side end thereof such that the leg product is conveyed hanging from the carrier.

The leg product is conveyed along the track of the poultry products conveyor in a direction of conveyance, with the leg product being suspended from the carrier in which it is arranged. Along the track, a knee cutter device, a thigh bone remover device and a thigh meat and knee meat harvester device are provided. In practical embodiments, the knee cutter device, thigh bone remover device and thigh meat and knee meat harvester device will be arranged in series.

While the leg product is suspended from the carrier, in accordance with the method according to the invention a transverse cut is made at the knee joint using the knee cutter device. The transverse cut is made from the rear side of the leg product towards the knee cap and extends generally in a direction transverse to the thigh bone and the tibia bone. The transverse cut has a cut end which is located adjacent to the rear side of the knee cap so that the thigh and the drumstick remain connected to each other and the knee cap remains intact. This means that the knee cap is not entirely cut through. It is possible that same damage is done to the knee cap when the transverse cut is made, but preferably the knee cap remains undamaged. By the transverse cut, a drumstick side cut plane and a thigh side cut plane are created. The drumstick side cut plane and the thigh side cut plane are connected to each other adjacent to the cut end.

Using the thigh bone remover device, the thigh bone is then removed from the thigh meat via the thigh side cut plane of the transverse cut in the knee joint. While this is done, the thigh meat and the drumstick remain connected to each other.

When removing the thigh bone from the thigh meat via the thigh side cut plane of the transverse cut in the knee joint, the thigh bone travels generally in its lengthwise direction through the thigh side cut plane of the transverse cut in the knee joint. Preferable, the entire thigh bone passes through the thigh side cut plane of the transverse cut during the removal of the thigh bone from the thigh meat.

Then, using the thigh meat and knee meat harvester device, the knee meat is severed from the knee cap while keeping the knee meat and the thigh meat connected to each other. Subsequently, the still interconnected knee meat and thigh meat are severed from the drumstick.

By removing the thigh bone via the thigh side cut plane, it is no longer necessary to make a longitudinal cut in the thigh meat along the thigh bone as is done in the mentioned prior art in order to remove the thigh bone. In the method according to the invention, preferably such a longitudinal cut is not made.

Furthermore, by removing the thigh bone via the thigh side cut plane, the connection between the drumstick and the thigh is not or hardly subjected to pulling forces that originate from the removal of the thigh bone from the thigh meat. Therefore, the chance that this connection breaks is reduced. Furthermore, even if the connection between the drumstick and the thigh should break, the thigh bone can still be removed from the thigh meat. Therewith, the process becomes more robust.

Furthermore, by keeping the knee meat and thigh meat interconnected, the knee meat adds to the weight of the harvested thigh meat, which increases the yield.

In a possible embodiment, the leg product that is provided further comprises thigh skin and drumstick skin. In this embodiment, the method further comprises the step of removing thigh skin from the thigh in a thigh deskinner device, while keeping the drumstick skin on the drumstick. This can be achieved for example by making an incision or perforation into the skin in the vicinity of the knee joint. This embodiment allows to produce drumsticks with the skin thereon and a thighs or thigh meat without skin. This is advantageous, because drumsticks are often demanded with skin and thighs or thigh meat without skin.

In a variant of this embodiment, the thigh skin is removed while the drumstick and thigh are still connected to each other but after the transverse cut at the knee is made. The transverse cut at the knee ensures that the drumstick skin remains on the drumstick when a pulling force, peeling force or rubbing force is exerted onto the thigh skin. By removing the thigh skin while the drumstick and the thigh are still connected to each other, it is possible to remove the thigh skin while the leg product is in the same product carrier and in which it was e.g. when the transverse cut at the knee joint was made. This reduces or even eliminates the need for manual handling and/or rehanging into a different carrier.

In a possible embodiment, the deskinning of the thigh takes place in a carrousel machine.

In a possible embodiment, the same poultry product carrier holds the leg product when the transverse cut at the knee is made, when the thigh bone is removed and when the interconnected knee meat and thigh meat is severed from the drumstick of said leg product. In this embodiment, the leg product is arranged in a poultry product carrier of the poultry products conveyor prior to the transverse cut at the knee is made, and remains in this same carrier while the thigh bone is removed and while the interconnected knee meat and thigh meat are severed from the drumstick. This eliminates the need for manual handling and/or rehanging into a different carrier during the carrying out of the method according to the invention.

In a possible embodiment, the leg product is positioned prior to making the transverse cut at the knee. For this positioning—in this embodiment—a leg positioner device is used that has a knee positioner with a knee positioner body, and a thigh stop. The positioning comprises bringing said leg product into a bent position by moving the knee positioner body and the thigh stop of said leg positioner device relative to each other from an inactive position to an active position. In the active position, the knee positioner body and the thigh stop both engage the leg product, and their relative position is such that the leg product is bent at the knee joint, and the knee joint is in front of the thigh stop. "In front" is related to the front of the leg product.

In the inactive position of the knee positioner body, the distance between the thigh stop and the knee positioner body and their relative position are such that the leg product can be arranged between the thigh stop and the knee positioner body while the leg product is suspended from the poultry product carrier.

In a possible embodiment, the leg product is positioned prior to making the transverse cut at the knee joint, which positioning comprises engaging the leg product by the knee cap with a knee cap lifter, and then moving the knee cap lifter from a lower position in which the knee cap lifter first engages the knee cap to an upper position. In the upper position of the knee cap lifter, the leg product is positioned relative to the knee cutter device in order for the knee cutter device to make the transverse cut, with the knee cap lifter supporting the leg product at the knee cap. This sustained support of the knee cap by the knee cap lifter provides an accurate positioning of the knee relative to the knee cutter device, regardless of the length of the leg product as a whole.

In a possible embodiment, both a leg positioner device and a knee cap lifter as described above are used. In that case, first the leg positioner device brings said leg product into a bent position by moving the knee positioner body and the thigh stop of said leg positioner device relative to each other from an inactive position to an active position. During said motion, the knee positioner body and the thigh stop both engage the leg product, and in the active position, their relative position is such that the leg product has been bent at the knee joint, and the knee joint is in front of the thigh stop. "In front" is related to the front of the leg product.

Then, the knee cap lifter engages the leg product by the knee cap. When the knee cap lifter engages the leg product, the knee positioner body and the thigh stop are in the active position and the knee positioner body and the thigh stop together bend the leg product. Then, the knee cap lifter is moved from a lower position in which the knee cap lifter first engages the knee cap, to an upper position. In the upper position of the knee cap lifter, the leg product is in a lifted position with the knee cap lifter supporting the leg product at the knee cap.

In a possible embodiment, the method further comprises the step of changing the angle between the thigh and the drumstick by bending the leg product at the knee joint while keeping the thigh and the drumstick connected to each other. Thereby, the transverse cut at the knee joint is opened and the thigh side cut plane becomes exposed. During the bending the thigh meat remains on the thigh bone and the drumstick meat remains on the tibia bone. This step is carried out after making a transverse cut at the knee joint and prior to removing the thigh bone from the thigh meat via the thigh side cut plane of the transverse cut in the knee joint.

In a variant, in this embodiment the step of removing the thigh bone from the thigh meat via the thigh side cut plane of the transverse cut at the knee joint comprises additional steps. In this variant, a defeathered whole leg poultry product is processed in which the thigh bone comprises a knee side condyle. The additional step of this variant are:

arranging a resilient scraper member comprising a central aperture adjacent to the thigh side cut plane of the transverse cut at the knee joint, forcing the knee side condyle through said central aperture by exerting a pushing force on the thigh bone, optionally on the hip side end of the thigh bone, thereby severing thigh meat from the knee side condyle of the thigh bone, engaging the thigh bone just behind the knee side condyle with a puller, while exerting a pulling force on the thigh bone by the puller, scraping the thigh meat from a region of the thigh bone between the knee side condyle and the hip side end using a scraper, wherein the thigh meat is scraped from the thigh bone in a scraping direction from the knee side end towards the hip side end of the thigh bone, cutting through any remaining tissue connections between the hip side end of the thigh bone and the thigh meat.

This variant has shown to be effective in removing the thigh bone from the thigh meat without breaking or otherwise damaging the thigh bone.

An advantage of scraping in the direction from the knee side end towards the thigh side end is that any oyster meat which may be present can be harvested together with and interconnected with the thigh meat. The oyster is a tasty piece of meat of about 10 to 15 grams which is present in the hip region of poultry. It is connected to the thigh meat, but this connection is not so strong. On the other hand, the oyster and the hip side end of the thigh bone are connected to each other quite strongly.

If thigh meat is scraped from the thigh bone in the direction from the knee side end to the hip side end, the connection between the thigh meat and the oyster is not subjected to large forces, so it generally stays intact. After the scraping, the thigh meat is only connected to the thigh bone via some connections with the hip side end, and when these are cut through, the connection between the oyster and the thigh bone can be easily cut through as well.

A further advantage of scraping in this direction is that the scraping action is largely independent from the shape and/or condition of the thigh bone in the hip region. The scraping is for example not disturbed by a missing hip side condyle. In general, the knee side end of the thigh bone tends to be less damaged by previous processing of the leg product than the hip side end. The hip side end can be damaged in a prior process, e.g. leading to the loss of the hip side condyle, e.g. when the leg was disconnected from the poultry body or during storage or transport of the leg product. As the transverse cut at the knee joint is generally made shortly before removal of the thigh bone, there is usually less damage to the knee side end of the thigh bone.

Preferably, the central aperture has a diameter that is variable between a minimum diameter and a maximum diameter, due to the resilience of the resilient scraper member. The minimum diameter is smaller than the maximum diameter of a knee side condyle of the thigh bone, and the central aperture is biased towards its minimum diameter. This provides an effective arrangement for severing the thigh meat from the knee side condyle and the thigh side condyle of the thigh bone.

Optionally, the minimum diameter of the central aperture is larger than the thickness of the thigh bone in the region between the knee side condyle and the hip side condyle or in the region between the knee side condyle and the hip side end if no hip side condyle is present. By keeping the minimum diameter of the central aperture larger than the thickness of the thigh bone in the region between the knee side condyle and the hip side end or hip side condyle, the difference between the minimum diameter of the central aperture and the diameter of the central aperture that is necessary to pass the knee side condyle and the hip side condyle through the central aperture is smaller than when the minimum diameter of the central aperture would not be larger than the thickness of the thigh bone in the region between the knee side condyle and the hip side condyle or hip side end. This makes that less force is exerted on the thigh bone during the severing of thigh meat from the knee side condyle and from the thigh side condyle and that the mechanical loads on the resilient scraper member with the central aperture itself are reduced as well. This reduces the risk of breaking the thigh bone and increases the life span of the resilient scraper member with the central aperture.

In a variant of this embodiment, when a leg product is processed of which the thigh bone further comprises a hip side condyle at the hip side end, the thigh meat is scraped from a region of the thigh bone between the knee side condyle and the hip side condyle. In this variant, the method further comprises the step of: after the scraping of the meat from the region of the thigh bone between the knee side condyle and the hip side condyle, forcing the hip side condyle through said central aperture by exerting a pulling force on the thigh bone, using the puller that engages the thigh bone just behind the knee side condyle, thereby severing thigh meat from the hip side condyle of the thigh bone. Optionally, the scraper is moved to an inactive state, away from the thigh bone, before the hip side condyle is forced through the central aperture.

In a variant of this embodiment, in case a leg product is processed that comprise a hip side condyle, the scraper moves when the hip side condyle passes the scraper to accommodate the increased diameter of the thigh bone at the hip side condyle. In general therefore, the scraper will move outwardly a bit. This prevents undue scraping forces to be exerted on the hip side condyle.

In a further variant of this embodiment, the puller moves the thigh bone back towards the resilient scraper member and the scraper again after the hip side end of the thigh bone has passed through the scraper, to a position in which the hip side end rests on the scraper. Then, the connection between in the thigh meat and the thigh bone at the hip side end of the thigh bone is cut through. This allows to obtain an optimal yield. Optionally, the connection between in the thigh meat and the thigh bone at the hip side end of the thigh bone is cut through by a sharp edge on the scraper. Alternatively, a separate cutter is provided that cuts directly adjacent to the scraper.

In a variant of any embodiment that comprises a scraper for scraping thigh meat from the thigh bone in a region between the knee side condyle and/or a region between the knee side condyle and the hip side end of the thigh bone, and in particular of the embodiment discussed above, regardless of the size of the minimum diameter of the central aperture, the scraper that scrapes the thigh meat from the region of the thigh bone between the knee side condyle and the hip side condyle is activated by the knee side condyle.

The scraper that scrapes the thigh meat from the region of the thigh bone between the knee side condyle and the hip side condyle has to become active at some point in time. In the embodiment in which the resilient scraper member with the central aperture severs thigh meat from the knee side condyle, this has to happen once the thigh meat is severed from the knee condyle by the resilient scraper member with the central aperture. The scraper that subsequently scrapes the thigh meat from the region of the thigh bone between the knee side condyle and the hip side condyle can become active after the thigh bone protrudes through the central aperture over a certain length. Once the relevant protrusion length is obtained, this can be detected, for example in a mechanical, electronic or optical way, which detection triggers the activation of the scraper.

In a possible embodiment, the thigh bone removal is carried out in a carrousel machine. The carrousel machine can comprise one or more processing devices that move along with a defeathered whole leg poultry product that undergoes the thigh bone removal. In a carrousel machine, the processing devices are mounted to be movable along a circular or other loop-shaped path, e.g. an elliptical path or a path made up out of a combination of straight lines and curves.

In a possible embodiment, in the step of severing the knee meat from the knee cap while keeping the knee meat and the thigh meat connected to each other, and subsequently severing the still interconnected knee meat and thigh meat from the drumstick, a knee meat scraper device is provided. The knee meat scraper device comprises a knee cap scraper and a counter element. The knee meat scraper device has a open state and a closed state. In the open state, the knee cap scraper and the counter element are spaced apart from each other, the spacing allowing the knee joint of the leg product to be introduced between the knee cap scraper and the counter element.

Then, while the leg product is suspended from said poultry product carrier and the knee meat scraper device is in the open state, the leg product is arranged adjacent to a counter element, the drumstick side cut plane facing the counter element.

Then, the knee meat scraper device is brought into a closed state. In the closed state, the knee cap scraper engages the leg product at the front side adjacent to the knee cap on the side of the drumstick and the counter element engages the leg product at or adjacent to the rear side of the knee cap.

Then, a scraping step is performed in which the drumstick and the knee cap scraper are moved away from each other, thereby moving the knee cap past the knee cap scraper while the counter element engages the leg product at or adjacent to the rear of the knee cap. By this, the knee meat is scraped from the knee cap while leaving the knee meat connected to the thigh, in particular to the thigh meat. The counter element makes sure that the knee cap scraper remains in close contact with the leg product during the scraping to ensure effective scraping of the knee meat from the knee cap despite the strong connection between the knee meat and the knee cap. The counter element can be stationary, with the counter element engaging the leg product at the same location during the scraping of the knee meat from the knee cap and the knee cap scraper moving relative to the counter element. In a different variant, the counter element and the knee cap scraper maintain the same position relative to each other during the scraping of the knee meat from the knee cap. In that case, the leg product and the counter element move relative to each other during the scraping of the knee meat from the knee cap. After the scraping the knee meat and thigh meat are present on a first side of the knee cap scraper and the knee cap is present on a second side of the knee cap scraper.

Optionally, the scraped knee cap is severed from the drumstick by cutting at a first cutting location which is situated between the knee cap and the drumstick. Optionally, the scraped knee cap is severed from the thigh and the knee meat by cutting at a second cutting location which is situated between the knee cap and the thigh, adjacent to the knee cap scraper. During the severing of the knee cap from the thigh and the knee meat, the knee meat and the thigh remain interconnected.

With this embodiment, the knee meat is harvested together with the thigh meat as a unitary piece of meat, and the knee meat and thigh meat remain interconnected with each other. Therewith, the knee meat adds to the thigh meat yield.

Furthermore, when carrying out the method according to this embodiment, a knee cap generally without knee meat is one of the end products. In some countries, this is regarded as a delicacy. The scraped, generally meat free knee cap can alternatively be used as a resource for the pharmaceutical and/or cosmetic industry.

In a possible embodiment, the drumstick is supported during at least the scraping step of the method according to the invention by a drumstick support element, when the drumstick and the knee meat scraper device are being moved away from each other to effect the scraping of the knee meat from the knee cap. This drumstick support element engages the drumstick at the drumstick side cut plane. This way, the drumstick is not or hardly subjected to tensile forces when the knee meat is being scraped from the knee cap. This in particular reduces the risk that the tibia bone breaks near the tarsal joint side end. A further advantage is that by making the drumstick side cut plane engage the drumstick support element, the position of the drumstick side cut plane relative to the knee cap scraper and the counter element is accurately defined and also made independent of the length of the drumstick. As the knee cap is located close to the drumstick side cut plane, the knee cap is also accurately positioned relative to the knee cap scraper and the counter element, again independent of the length of the drumstick.

Preferably, the part of the drumstick support element that actually engages the drumstick side cut plane of the drumstick, extends substantially perpendicular to the direction in which the drumstick and the knee cap scraper move relative to each other during the scraping of the knee meat from the knee cap.

Optionally, the drumstick support element engages the tibia bone when the drumstick and the knee meat scraper device are being moved away from each other. By doing this, the tibia bone is not or hardly subjected to forces caused by the scraping of the knee meat from the knee cap.

In a possible embodiment, the counter element and/or knee cap scraper of a knee meat scraper device bring the drumstick into engagement with the drumstick support element. The counter element and/or the knee cap scraper engage the drumstick and for example lift the drumstick up to a level and/or a position above the drumstick support element. Then, the drumstick is lowered or otherwise moved onto the drumstick support element.

In a possible embodiment, before the knee meat scraper device is brought into its closed state, the counter element is arranged in or brought into a position adjacent to but at a distance from the drumstick side cut plane. This can be the position in which the counter element is in the open state of the knee meat scraper device. Then, in this embodiment, the counter element is moved towards the drumstick until it engages the drumstick side cut plane. Then, the counter element moves the drumstick side cut plane towards and into a predetermined drumstick reference position, preferably while the counter element remains in engagement with the drumstick side cut plane. The location of the drumstick reference position relative to the position of the knee cap scraper is known. As the knee cap is located close to the drumstick side cut plane and the position of the drumstick side cut plane is known when the drumstick side cut plane is in the drumstick reference position, the location of the knee cap relative to the knee cap scraper is also quite accurately known when the drumstick side cut plane is in the drumstick reference position.

This way, the counter element positions the drumstick and the knee cap in a reliable way relative to the knee cap scraper before the knee cap scraper engages the front side of the leg product adjacent to the knee cap on the drumstick side of the knee cap. Furthermore, the position of the drumstick side cut plane relative to the knee cap scraper is made independent of the length of the drumstick. Optionally, the drumstick reference position in which the counter element brings the drumstick side cut plane is a position in which the knee cap scraper engages the front side of the leg product adjacent to the knee cap on the drumstick side of the knee cap. In this variant, when the drumstick side cut plane is in the drumstick reference position, the knee meat scraper device is in its closed state.

In a variant of this embodiment, the counter element has a front side and a top side. In this variant, the counter element is also moved towards the rear side of the knee cap until it engages the rear side of the knee cap. Then, the counter element then moves the knee joint of the leg product to an end-of-stroke position, preferably over a small distance. Then, the counter element moves towards the drumstick side cut plane until the top side of the counter element engages the drumstick side cut plane. The top side of the counter element remains in engagement with the drumstick side cut plane and moves the drumstick side cut plane towards and into the drumstick reference position. The front side of the counter element remains in contact with the rear of the knee cap when the counter element moves from the end-of-stroke position towards and into the drumstick reference position. Optionally, in this movement, the counter element moves back in a direction towards the rear side of the leg product.

In a possible embodiment, the counter element moves the knee joint to the end-of-stroke position, but not the drumstick side cut plane to the drumstick reference position.

In a possible embodiment, the knee cap scraper and the counter element sever the knee cap from the interconnected thigh and knee meat in a scissors-like action. In this embodiment, preferably at least one of the knee cap scraper and the counter element is provided with a sharp edge.

The first aspect of the invention further pertains to a system for processing a defeathered whole leg poultry product, which defeathered whole leg poultry product comprises:

a thigh, which thigh comprises at least a thigh bone and thigh meat, wherein the thigh bone has a knee side end and a hip side end, a drumstick, which drumstick comprises at least a tibia bone and drumstick meat, wherein the tibia bone has a knee side end and a tarsal joint side end, a knee joint, which knee joint comprises at least the knee cap, knee meat on said knee cap and a connection between the thigh and the drumstick, which defeathered whole leg poultry product has a front side, which is the side on which the knee cap is located, and a rear side, which is the side opposite to the front side, wherein the system comprises:
a poultry products conveyor comprising:
a track,
a plurality of poultry product carriers which are spaced apart from one another in the direction of the track and which are movable along said track, wherein each poultry product carrier is adapted to hold at least one defeathered whole leg poultry product at or adjacent to the tarsal joint side end thereof such that the defeathered whole leg poultry product is conveyed hanging from said poultry product carrier, a knee cutter device, which knee cutter device is arranged along the track of the poultry products conveyor, wherein the knee cutter device is adapted and arranged to make a transverse cut at the knee joint while the defeathered whole leg poultry product is suspended from the poultry product carrier, which transverse cut is made from the rear side of the defeathered whole leg poultry product towards the knee cap, which transverse cut extends generally in a direction transverse to the thigh bone and the tibia bone, said transverse cut having a cut end which is located adjacent to the rear side of the knee cap so that the thigh and the drumstick remain connected to each other and the knee cap remains intact, by which transverse cut a drumstick side cut plane and a thigh side cut plane are created, a thigh bone remover device which is arranged along the track of the poultry products conveyor, downstream of the knee cutter device, which thigh bone remover device is adapted to remove the thigh bone from the thigh meat via the thigh side cut plane of the transverse cut in the knee joint while keeping the thigh and the drumstick connected to each other, a thigh meat and knee meat harvester device which is arranged along the track of the poultry products conveyor, downstream of the thigh bone remover device, which thigh meat and knee meat harvester device is adapted to sever the knee meat from the knee cap while keeping the knee meat and the thigh meat connected to each other, and to subsequently sever the still interconnected knee meat and thigh meat from the drumstick.

The defeathered whole leg poultry product ("leg product") that is processed by the system according to the invention comprises a thigh, a drumstick and a knee joint. In practical embodiments, usually the leg part between the tarsal joint and the foot as well as the foot itself have already been removed.

The thigh comprises at least a thigh bone and thigh meat. The thigh bone has a knee side end and a hip side end.

Optionally, a knee side condyle is present at the knee side end of the thigh bone.

Optionally, the thigh bone may still comprise a hip side condyle, or the hip side condyle may have been removed either intentionally or unintentionally. If the hip side condyle is still present, the diameter of the thigh bone at the hip side end will be larger than the diameter of the thigh bone between the knee side condyle and the hip side condyle, as the thigh bone is thicker at the condyles than between the condyles.

If no hip side condyle is present, this means that the hip side condyle has been removed from the thigh bone. This can be done intentionally, e.g. as a consequence of the choses way to separate the leg product from the rest of the poultry carcass, on unintentionally, e.g. by breaking it off during transport or storage. If no hip side condyle is present any more, the diameter of the thigh bone at the hip side end will be similar to the diameter of the thigh bone just behind the knee side condyle.

The "region of the thigh bone between the knee side condyle and the hip side condyle" is a part of the "region of the thigh bone between the knee side condyle and the hip side end" if a hip side condyle is present.

The drumstick comprises at least a tibia bone and drumstick meat. The tibia bone has a knee side end and a tarsal joint side end.

The knee joint comprises at least the knee cap, knee meat on said knee cap and a connection between the thigh and the drumstick.

The defeathered whole leg product has a front side, which is the side on which the knee cap is located, and a rear side, which is the side opposite to the front side.

The system according to the invention comprises a poultry products conveyor. The poultry products conveyor comprises a track and a plurality of poultry product carriers. The poultry product carriers are spaced apart from one another in the direction of the track and are movable along said track. Each poultry product carrier is adapted to hold at least one leg product at or adjacent to the tarsal joint side end thereof such that the poultry product is conveyed hanging from said poultry product carrier.

The system according to the invention further comprises a knee cutter device. The knee cutter device is arranged along the track of the poultry products conveyor. The knee cutter device is adapted and arranged to make a transverse cut at the knee joint while the leg product is suspended from the poultry product carrier. This means for example that the horizontal and vertical distance of the knee cutter device relative to the track and the poultry product carriers are such that the cutter can engage the leg product at the knee so a transverse cut can be made at the knee. The transverse cut is made from the rear side of the leg product towards the knee cap and extends generally in a direction transverse to the thigh bone and the tibia bone. The transverse cut has a cut end which is located adjacent to the rear side of the knee cap so that the thigh and the drumstick remain connected to each other and the knee cap remains intact. By the transverse cut a drumstick side cut plane and a thigh side cut plane are created. The drumstick side cut plane and the thigh side cut plane are connected to each other adjacent to the cut end.

The system according to the invention further comprises a thigh bone remover device. The thigh bone remover device is arranged along the track of the poultry products conveyor, downstream of the knee cutter device. The thigh bone remover device is adapted to remove the thigh bone from the thigh meat via the thigh side cut plane of the transverse cut in the knee joint while keeping the thigh and the drumstick connected to each other.

The system according to the invention further comprises a thigh meat and knee meat harvester device. The thigh meat and knee meat harvester device is arranged along the track of the poultry products conveyor, downstream of the thigh bone remover device. The thigh meat and knee meat harvester device is adapted to sever the knee meat from the knee cap while keeping the knee meat and the thigh meat connected to each other, and to subsequently sever the still interconnected knee meat and thigh meat from the drumstick.

In a possible embodiment of the system according to the invention, the leg product that is to be processed by the system according to the invention further comprises thigh skin and drumstick skin. In this embodiment, the system further comprises a thigh deskinner device, which is arranged along the track of the poultry products conveyor, downstream of the knee cutter device. The thigh deskinner device is adapted to remove the thigh skin from the thigh while keeping the drumstick skin on the drumstick. The thigh deskinner device is for example arranged at such a horizontal and vertical distance from the track and the poultry products conveyor that it can engage the thigh skin. As the transverse cut at the knee joint has already been made prior to the deskinning of the thigh, the drumstick skin will stay on the drumstick during the deskinning of the thigh if the thigh deskinner device does not engage the drumstick but only the thigh.

In a possible embodiment, the system further comprises a leg positioner device, which is adapted to position a single defeathered whole leg poultry product. The leg positioner device is arranged along the track of the poultry products conveyor. The leg positioner device comprises a thigh stop and a knee positioner with a knee positioner body. The thigh stop is adapted and arranged to engage the thigh. The thigh stop and the knee positioner body are moveable relative to each other between an inactive position and an active position. During this motion, the knee positioner body and the thigh stop both engage defeathered whole leg poultry product, and in the active position their relative position is such that the defeathered whole leg poultry product has been bent at the knee joint, and the knee joint is in front of the thigh stop. "In front" is related to the front of the leg product.

In the inactive position of the knee positioner body, the distance between the thigh stop and the knee positioner body and their relative position are such that the defeathered whole leg poultry product can be arranged between the thigh stop and the knee positioner body while the defeathered whole leg poultry product is suspended from the poultry product carrier.

In a possible embodiment, the system further comprises a knee cap lifter, which is adapted and arranged to engage the leg product by the knee cap. For example, the knee cap lifter is arranged at such a horizontal and vertical distance from the track and the poultry products conveyor that it can engage the knee cap of a leg product that is arranged in a carrier of the poultry products conveyor.

The knee cap lifter is moveable between a lower position and an upper position, in which lower position the knee cap lifter engages the knee cap. In the upper position of the knee cap lifter, the leg product is positioned relative to the knee cutter device in order for the knee cutter device to make the transverse cut, with the knee cap lifter supporting the leg product at the knee cap.

The above two embodiments are optionally combined into a system that comprises a leg positioner device as well as a knee lifter.

In such an embodiment, optionally the knee cap lifter in its lower position engages the knee cap while the leg product is held in the bent position by the knee positioner and the thigh stop, and in the upper position of the knee cap lifter, the leg product is in a lifted position with the knee cap lifter supporting the leg product at the knee cap.

In a possible embodiment, the thigh bone remover device comprises a bender device, a resilient scraper member having a central aperture and an thigh bone mover assembly.

The bender device is adapted to engage the leg product and bend it at the knee joint into a bent position. By this bending, the angle between the thigh and the drumstick is changed and the transverse cut at the knee joint is opened. This results in exposing the thigh side cut plane. During this bending, the thigh and the drumstick remain connected to each other and the thigh meat remains on the thigh bone and the drumstick meat remains on the tibia bone. The bender device is further adapted to keep the leg product in the bent position.

The thigh bone remover assembly is adapted to remove the thigh bone from the thigh meat via the thigh side cut plane of the transverse cut at the knee joint while the thigh and the drumstick are kept connected to each other and while the transverse cut at the knee joint is kept open by the bender device.

By removing the thigh bone via the thigh side cut plane, it is no longer necessary to make a longitudinal cut in the thigh meat along the thigh bone.

Furthermore, by removing the thigh bone via the thigh side cut plane, the connection between the drumstick and the thigh is not or hardly subjected to pulling forces that originate from the removal of the thigh bone from the thigh meat. Therefore, the chance that this connection breaks is reduced. Furthermore, even if the connection between the drumstick and the thigh should break, the thigh bone can still be removed from the thigh meat. Therewith, the process becomes more robust.

The resilient scraper member with a central aperture is arrangeable adjacent to the thigh side cut plane of the transverse cut at the knee joint. The central aperture has a diameter that is variable between a minimum diameter and a maximum diameter due to the resilience of the resilient scraper. The minimum diameter is smaller than the maximum diameter of a knee side condyle of the thigh bone. The central aperture is biased towards its minimum diameter.

The thigh bone displacement assembly is adapted to force the thigh bone through the central aperture while the transverse cut at the knee joint is kept open and the thigh and the drumstick are kept connected to each other. By moving the thigh bone through the central aperture thigh meat is severed from the thigh bone.

This embodiment can be adapted to sever thigh meat from the entire thigh bone or just from a part thereof, e.g. just from the knee side condyle and/or the hip side condyle (if a hip side condyle is present). If it is desired the that thigh meat is severed from the entire thigh bone, the minimum diameter of the central aperture is selected to be smaller than the thickness of the thigh bone in the region between the knee side condyle and the hip side condyle or in the region between the knee side condyle and the hip side end if no hip side condyle is present.

If it is desired that the resilient scraper member with a central aperture should only sever thigh meat from the knee side condyle and optionally from the hip side condyle, the minimum diameter of the central aperture is advantageously selected to be larger than the thickness of the thigh bone in the region between the knee side condyle and the hip side condyle or—if no hip side condyle is present—in the region between the knee side condyle and the hip side end. If no hip side condyle is present any more, the diameter of the thigh bone at hip side end will generally be similar to the diameter of the thigh bone just behind the knee side condyle. In the variant in which the minimum diameter of the central aperture is larger than the diameter of the thigh bone between the knee side condyle and the hip side condyle or hip side end, the thigh meat can be severed from the part of the thigh bone between the knee side condyle and the hip side condyle in a different way and/or by different means, e.g. by scraping using a scraper. If no hip side condyle is present any more at the thigh bone, the diameter of the thigh bone at hip side end will generally be similar to the diameter of the thigh bone just behind the knee side condyle.

In a possible embodiment, the resilient scraper member is provided with a recess with slanting walls, e.g. a generally half-spherical or conical recess, wherein the central aperture is arranged at the deepest part of said recess. As the thigh bone will provide the strongest resistance when the thigh is forced against the resilient scraper member with the central aperture, the knee side end of the thigh bone will assume a position in which said knee side end is located in the central aperture. The slanting walls guide the knee side end of the thighbone gradually towards and into the central aperture, even when of the thigh bone is initially not entirely aligned with the central aperture. This further reduces the risk of breaking the thigh bone.

In a possible embodiment, the thigh bone remover assembly comprises or further comprises a scraper and a puller.

The scraper is adapted to scrape the thigh meat from the thigh bone in a region between the knee side condyle and the hip side condyle of between the knee side condyle and the hips side end if no hip side condyle is present any more, in the direction from the knee side end towards the hip side end. The puller is adapted to exert a pulling force on the thigh bone in order to move the thigh bone relative to the scraper. As explained before, this helps to harvest the oyster meat while keeping it interconnected with the thigh meat, and makes the scraping process more robust as the scraping starts from the generally undamaged knee side end of the thigh bone.

Optionally, the puller is adapted to engage the thigh bone at or adjacent to the knee side condyle, preferably after the knee side condyle has been moved through the central aperture. To this end, the puller optionally comprises a moveable puller plate which has a slot, e.g. a V-shaped slot, that has such a shape and size that it can grab the thigh bone by or adjacent to the knee side condyle. In an alternative embodiment, the puller may comprise two jaws that are adapted to clamp the thigh bone between them.

The scraper optionally comprises two scraper elements between which the thigh bone is to be arranged. The scraper elements are preferably moveable relative to each other and biased towards the thigh bone.

Optionally, the puller is adapted to pull the hip side condyle of the thigh bone through the central aperture in case such a hip side condyle is present. In this embodiment, the puller is able to exert enough force to pull the hip side condyle through the central aperture and the stroke over which the puller is moveable is long enough to pull the hip side condyle through the central aperture. Optionally, the scraper is transferred into an inactive state before the hip side condyle is pulled though the central aperture.

Optionally, the thigh bone remover assembly comprises a scraper activator. For example, the scraper can have an active state and an inactive state. The scraper can be in an inactive state while the knee side condyle is being forced through the central aperture. In the inactive state, the scraper, in particular any scraper elements if such are present, do not engage the thigh bone. Once the knee side condyle of the thigh bone has passed through the central aperture, the scraper can be brought into the active state. In the active state, the scraper, in particular any scraper elements if such are present, engage the thigh bone or tissues on the thigh bone. The thigh bone displacement assembly then moves the thigh bone relative to the scraper so that the thigh meat is severed from the thigh bone, at least in the region of the thigh bone between the knee side condyle and the hip side condyle. The scraper activator induces the transition from the inactive state to the active state.

In a possible variant of this embodiment the scraper comprises at least one scraper element that is biased towards the thigh bone. In the inactive state, the scraper element is in a position away from the thigh bone. The scraper element is locked in this inactive state by a locking device, e.g, by a locking pin or latch. Once the knee side condyle has passed through the central aperture, the scraper activator is triggered and actuates the locking device, thereby releasing the scraper element. Due to the biasing of the scraper element, the scraper element then moves into an active state, in which it engages the thigh bone or tissue on the thigh bone (e.g. a pellicle or membrane on the thigh bone).

The triggering of the scraper activator can take place in many different ways. For example, the triggering can be caused by the thigh bone that protrudes from the central aperture. Once the thigh bone protrudes from the central aperture over a certain predetermined length, the triggering is activated. The triggering can for example occur by a mechanical, electrical or optical sensor that detects that the predetermined length of protrusion of the thigh bone through the central aperture has occurred. In a possible variant, the knee side condyle of the thigh bone engages a moveable trigger block when the predetermined length of protrusion of the thigh bone through the central aperture has occurred. The moveable trigger block is connected to a locking pin that locks the scraper element or scraper elements in the inactive state. Moving the thigh bone further through the central aperture makes that the movable trigger block moves along with the thigh bone. The locking pin moves along with the moveable trigger block, and therewith releases the scraper element or scraper elements so that the scraper element or scraper elements come into the active state.

In a possible embodiment, at least one thigh bone remover device is arranged in a carrousel machine. In the carrousel machine, the one or more processing devices move along with a defeathered whole leg poultry product that undergoes the method according to the invention. In a carrousel machine, the processing devices are mounted to be movable along a circular or other loop-shaped path, e.g. an elliptical path or a path made up out of a combination of straight lines and curves.

In a possible embodiment, the knee meat and thigh meat harvester remover module comprises a knee meat scraper device, a scraping motion device, a drumstick—knee cap separator and a knee cap—thigh separator.

The knee meat scraper device comprises a knee cap scraper and a counter element. The counter element is arranged at a distance from the track of the poultry products conveyor, which distance is selected to make it possible to arrange the leg product adjacent to the counter element with the drumstick side cut plane facing the counter element while the leg product is suspended from said poultry product carrier.

The knee meat scraper device has an open state and a closed state. In the open state the knee cap scraper and the counter element are spaced apart from each other, allowing the knee joint of the leg product to be introduced between the knee cap scraper and the counter element. In the closed state the knee cap scraper engages the front of the leg product at or adjacent the knee cap on the drumstick side of said knee cap and the counter element engages the leg product at or adjacent the rear of the knee cap in order to allow scraping of the knee meat from the knee cap.

The knee meat and thigh meat harvester device further comprises a scraping motion device, that is adapted to cause a relative movement of the drumstick and the knee cap scraper away from each other. By this movement, the knee cap is pulled past the knee cap scraper while the counter element engages the leg product at or adjacent to the rear of the knee cap. This induces the scraping of the knee meat from the knee cap while leaving the knee meat connected to the thigh, in particular to the thigh meat.

The counter element makes sure that the knee cap scraper remains in close contact with the leg product during the scraping to ensure effective scraping of the knee meat from the knee cap despite the strong connection between the knee meat and the knee cap. The counter element can be stationary, with the counter element engaging the leg product at the same location during the scraping of the knee meat from the knee cap and the knee cap scraper moving relative to the counter element. In a different variant, the counter element and the knee cap scraper maintain the same position relative to each other during the scraping of the knee meat from the knee cap. In that case, the leg product and the counter element move relative to each other during the scraping of the knee meat from the knee cap.

After the scraping the knee meat and thigh meat are present on a first side of the knee cap scraper and the knee cap on a second side of the knee cap scraper.

In operation of the system according to the invention, first the knee meat scraper device is in the open state. While the knee meat scraper device is in the open state, the knee joint of the leg product is arranged between the knee cap scraper and the counter element. Then, the knee meat scraper device is transferred from the open state to the closed state. This brings the knee cap with the knee meat thereon in the right starting position for the scraping of the knee meat from the knee cap. The scraping is started when the scraping motion device starts moving the drumstick and the knee cap scraper away from each other. During the scraping, the knee cap scraper and the counter element of the knee meat scraper device may generally maintain their position relative to each other, so they generally remain in the relative position they have in the closed state of the knee meat scraper device. Alternatively, during the scraping the counter element remains in a stationary position relative to the knee cap and the knee cap scraper moves relative to the counter element.

The knee meat and thigh meat harvester device of the system according to the invention optionally further comprises a drumstick—knee cap separator. This drumstick—knee cap separator is adapted and arranged to sever the knee cap from the drumstick after the knee meat has been scraped off the knee cap. The drumstick—knee cap separator is further adapted and arranged to make a cut at a first cutting location. The first cutting location is situated between the knee cap and the drumstick. The knee cap is severed from the drumstick after the knee meat has been scraped off the knee cap. The drumstick—knee cap separator being adapted and arranged to sever the knee cap from the drumstick for example involves arranging it at a suitable distance from the poultry products conveyor.

The knee meat and thigh meat harvester device optionally further comprises a knee cap—thigh separator. The knee cap—thigh separator is adapted and arranged to sever the knee cap from the thigh and the knee meat. The severing takes place after the knee meat has been scraped from the knee cap. The knee cap—thigh separator is further adapted and arranged to make a cut at a second cutting location. The second cutting location is situated between the knee cap and the thigh, adjacent to the knee cap scraper. During the severing of the knee cap from the thigh and the knee meat, the knee meat and the thigh, in particular the knee meat and the thigh meat, remain interconnected. The knee cap—thigh cap separator being adapted and arranged to sever the knee cap from the thigh for example involves arranging it at a suitable distance from the poultry products conveyor.

After the knee cap—thigh separator and the drumstick—knee cap separator have done their job, the knee cap is severed from the other parts of the leg product, so it can be harvested as a separate item. Optionally, the thigh, the knee cap and the drumstick are discharged separately from the system according to the invention. Optionally, the drumstick, the thigh and the knee cap from the same leg product are presented together to an inspector, inspection station or inspection system, to check whether the knee cap is severed in the right way.

It is possible to first sever the drumstick and the knee cap from each other and then the knee cap from the thigh and the knee meat. In that case, with the severing of the knee cap from the drumstick, the thigh and the drumstick are no longer connected to each other. As an alternative, it is possible to first sever the knee cap from the thigh (including the knee meat) from each other and then the drumstick and the knee cap. In that case, with the severing of the knee cap from the thigh and the knee meat, the thigh and the drumstick are no longer connected to each other. As a further alternative, it is possible to perform both severing actions simultaneously.

Severing the drumstick and the knee cap from each other before or at the same time as severing the knee cap from the thigh and knee meat has the advantage that it offers the opportunity to keep the connection between the thigh and the drumstick under tension during the action of severing the knee cap from the drumstick, which facilitates a controlled severing of the knee cap and the drumstick. This still does not inhibit a controlled severing of the knee cap from the thigh and the knee meat, as after the scraping, the knee cap is on the first side of the knee cap scraper and the thigh and the knee meat are on the second side of the knee cap scraper. By arranging the second cutting location adjacent to the knee cap scraper, the severing of the knee cap from the thigh and the knee meat can still take place in a controlled manner.

In a possible embodiment, the second cutting location is located on the second side of the knee cap scraper, so on the side of the knee cap. This way, the knee cap scraper shields the thigh and the knee meat from accidental damage by the knee cap—thigh separator when severing the knee cap from the thigh and knee meat. In an alternative embodiment, the second cutting location is located on the first side of the knee cap scraper, so on the side of the thigh and the knee meat.

In a possible embodiment, the knee meat and thigh meat harvester device further comprises a drumstick support element. The drumstick support element is adapted to support the drumstick, at least during the scraping step, when the drumstick and the knee meat scraper device are being moved away from each other. The drumstick support element is arranged and adapted to engage the drumstick at the drumstick side cut plane. This way, the drumstick is not or hardly subjected to forces that originate from the scraping of the knee meat from the knee cap. Preferably, the part of the drumstick support element that actually engages the drumstick side cut plane of the drumstick, extends substantially perpendicular to the direction in which the drumstick and the knee cap scraper move relative to each other during the scraping of the knee meat from the knee cap.

Optionally, the drumstick support element is arranged and adapted to engage the tibia bone when the drumstick and the knee meat scraper device are being moved away from each other. This way, the tibia bone is not or hardly subjected to forces during the scraping of the knee meat.

In a possible embodiment, the drumstick support element is a drumstick support plate. The drumstick support plate comprises a drumstick support surface which is arranged and adapted to engage the drumstick side cut plane of the drumstick during the scraping of the knee meat from the knee cap.

In a first variant of this embodiment, the drumstick is supported by a drumstick support surface on a first side of the drumstick support plate during the scraping. The knee joint and the thigh extend at an angle relative to the drumstick support surface, for example substantially perpendicular, from an edge of the drumstick support plate. The counter element and/or the knee meat scraper are arranged on the side of the drumstick support plate opposite to the drumstick support surface. Preferably, the knee cap is situated adjacent to and/or below the lateral side of the drumstick support plate opposite to the drumstick support surface.

In a second variant of this embodiment, the drumstick support plate comprises an aperture which extends through the drumstick support plate between the drumstick support surface and the side of the drumstick support plate opposite to the drumstick support surface. The aperture is for example a slot with one or two open ends. The aperture allows the drumstick to be arranged on the side of the drumstick support surface and the thigh to be arranged on the side of the drumstick support plate opposite to the drumstick support surface during the scraping. Preferably, the knee cap is situated adjacent to and/or below the lateral side wall of the aperture in the drumstick support plate. The knee joint and the thigh extend at an angle relative to the drumstick support surface, for example substantially perpendicular. During the scraping, the drumstick remains present on a first side of the drumstick support plate and the thigh remains present on the opposite side of the drumstick support plate. The counter element and the knee meat scraper are arranged on the side of the drumstick support plate opposite to the drumstick support surface.

In a possible embodiment, the scraping motion device comprises a scraper driver device that is adapted to move the knee cap scraper away from the drumstick in order to induce the scraping of the knee meat from the knee cap.

Optionally, the scraper driver device is adapted to also move the counter element away from the drumstick during the scraping of the knee meat from the knee cap, together with the knee cap scraper.

In a possible embodiment, the scraping motion device comprises a positioner driver device which is adapted to move the knee cap scraper and/or the counter element to engage the leg product and to bring the drumstick of said leg product into engagement with the drumstick support element prior to the scraping of the knee meat from the knee cap.

In a possible embodiment, before the knee meat scraper device is brought into a closed state, the counter element is arranged in or brought into a position adjacent to but at a distance from the drumstick side cut plane. This can be the position in which the counter element is in the open state of the knee meat scraper device. Then, the counter element is moved by the positioner driver device towards the drumstick until it engages the drumstick side cut plane. Then, the counter element is moved by the positioner driver device towards a predetermined drumstick reference position by the positioner driver device, taking the drumstick with it, preferably while the counter element remains in engagement with the drumstick side cut plane. The location of the drumstick reference position relative to the position of the knee cap scraper is known. As the knee cap is located close to the drumstick side cut plane and the position of the drumstick side cut plane is known when the drumstick side cut plane is in the drumstick reference position, the location of the knee cap relative to the knee cap scraper is also quite accurately known when the drumstick side cut plane is in the drumstick reference position.

This way, the counter element positions the drumstick and the knee cap in a reliable way relative to the knee cap scraper before the knee cap scraper engages the front side of the leg product adjacent to the knee cap on the drumstick side of the knee cap. Furthermore, the position of the drumstick side cut plane relative to the knee cap scraper is made independent of the length of the drumstick. Optionally, the drumstick reference position in which the counter element brings the drumstick side cut plane is a position in which the knee cap scraper engages the front side of the leg product adjacent to the knee cap on the drumstick side of the knee cap. In this variant, when the drumstick side cut plane is in the drumstick reference position, the knee meat scraper device is in its closed state.

In a variant of this embodiment, the counter element has a front side and a top side. In this variant, the counter element is also moved towards the rear side of the knee cap until it engages the rear side of the knee cap. Then, the counter element moves the knee joint of the leg product to an end-of-stroke position, preferably over a small distance. Then, the counter element is moved by the driver positioner device towards the drumstick side cut plane until the top side of the counter element engages the drumstick side cut plane. The top side of the counter element remains in engagement with the drumstick side cut plane and moves the drumstick side cut plane towards and into the drumstick reference position. The front side of the counter element remains in contact with the rear of the knee cap when the counter element is moved from the end-of-stroke position towards and into the drumstick reference position. Optionally, in this movement, the counter element moves back in a direction towards the rear side of the leg product.

In a possible embodiment, the counter element moves the knee joint to the end-of-stroke position, but not the drumstick side cut plane to the drumstick reference position.

In a possible embodiment, the scraper driver device and the positioner driver device are combined into a combined driver device which fulfills both functions. In such an embodiment, for example, both the knee cap scraper and the counter element are provided with a cam follower that is moveable through an associated knee cap scraper cam track or an associated counter element cam track, respectively. Via the respective cam track and cam follower, the knee cap scraper and the counter element make all the desired movements for bringing the drumstick of the leg product into engagement with the drumstick support element and performing the action of scraping the knee meat from the knee cap.

In a possible embodiment, the distance over which the drumstick and the knee cap scraper are moved relative to each other during the scraping step is adjustable. This way, the length of the scraping path is adjustable, allowing it to be matched to the expected size of the knee cap. By doing so, it is ensured that all knee meat is scraped from the knee cap, wile at the same time the thigh meat is not damaged by the knee cap scraper.

In a possible embodiment, the distance between the drumstick support element (in particular the drumstick support plane thereof, if that is present) and the second cutting location is adjustable. This way, it is ensured that the second cutting location is such that no pieces of the knee cap remain attached to the knee meat, and also that as little as possible of the knee meat remains behind on the knee cap after severing the knee cap and the thigh. The distance can be chosen on the basis of the expected size of the knee cap.

The adjustment of the length of the scraping path and/or the distance between the drumstick support element and the second cutting location can be achieved in many ways. For example, the combined driver device and/or the scraper driver device can be adjustable, e.g. by providing an adjustable cam track, e.g. by using an exchangeable cam track part. The distance between the drumstick support element and the second cutting location can for example be adjusted by adjusting the position of the drumstick support element and/or the position of the knee cap—thigh separator, or by arranging shims or filler plates on the drumstick support element.

In a possible embodiment, the knee cap scraper and the counter element are moveable relative to each other to perform a scissors-like cutting operation and therewith act as the knee cap—thigh separator. In this embodiment, preferably at least one of the knee cap scraper and the counter element is provided with a sharp edge.

In a possible embodiment, at least knee meat and thigh meat harvester device is arranged in a carrousel machine. In the carrousel machine, the one or more knee meat and thigh meat harvester devices move along with a defeathered whole leg poultry product that undergoes the method according to the invention. In a carrousel machine, the processing devices are mounted to be movable along a circular or other loop-shaped path, e.g. an elliptical path or a path made up out of a combination of straight lines and curves.

In a second aspect of the invention, a system and method for making a knee cut in a defeathered whole leg poultry product is provided.

The system according to the second aspect of the invention can optionally be combined with a system according to the first aspect of the invention.

The method according to the second aspect of the invention can optionally be combined with a method according to the first aspect of the invention.

It is the object of the second aspect of the invention to provide an improved system and method for making a knee cut in a defeathered whole leg poultry product.

This object is achieved with a system for making a knee cut in a defeathered whole leg poultry product, wherein the defeathered whole leg poultry product comprises:
 a thigh, which thigh comprises at least a thigh bone and thigh meat, wherein the thigh bone has a knee side end and a hip side end,
 a drumstick, which drumstick comprises at least a tibia bone and drumstick meat, wherein the tibia bone has a knee side end and a tarsal joint side end,
 a knee joint, which knee joint comprises at least the knee cap and a connection between the thigh and the drumstick,
 which defeathered whole leg product has a front side, which is the side on which the knee cap is located, and a rear side, which is the side opposite to the front side,
 wherein the system comprises:
 a poultry products conveyor comprising:
 a track,
 a plurality of poultry product carriers which are spaced apart from one another in the direction of the track and which are movable along said track in a direction of conveyance, wherein each poultry product carrier is adapted to hold at least one defeathered whole leg poultry product at or adjacent to the tarsal joint side end thereof such that the poultry product is conveyed hanging from said poultry product carrier, wherein the poultry product carrier is adapted to allow rotation of the defeathered whole leg poultry product about the tibia bone of said defeathered whole leg poultry product and about an axis generally perpendicular to said tibia bone,
 a leg positioner device, which is adapted to position a single defeathered whole leg poultry product, which leg positioner device is arranged along the track of the poultry products conveyor,
 wherein said leg positioner device comprises:
 a thigh stop, which is adapted and arranged to engage the thigh,
 a knee positioner having a knee positioner body, wherein the thigh stop and the knee positioner body are moveable relative to each other between an inactive position and an active position, wherein the knee positioner body and the thigh stop both engage the defeathered whole leg poultry product when moving from the inactive position to the active position, and in the active position their relative position is such that the defeathered whole leg poultry product is bent at the knee joint, and the knee joint is in front of the thigh stop, an wherein in the inactive position of the knee positioner body, the distance between the thigh stop and the knee positioner body and their relative position are such that the defeathered whole leg poultry product can be arranged between the thigh stop and the knee positioner body while the defeathered whole leg poultry product is suspended from the poultry product carrier,
 a knee cap lifter, which is adapted and arranged to engage the defeathered whole leg poultry product by the knee cap when the knee positioner body and the thigh stop are in the active position and bend the defeathered whole leg poultry product,
 which knee cap lifter is moveable between a lower position and an upper position, in which lower position the knee cap lifter engages the knee cap while the defeathered whole leg poultry product is held in the bent position by the knee positioner body and the thigh stop, and wherein in the upper position of the knee cap lifter, the defeathered whole leg poultry product is in a lifted position with the knee cap lifter supporting the defeathered whole leg poultry product at the knee cap,
 a knee cutter device, which knee cutter device is arranged along the track of the poultry products conveyor,
 wherein the knee cutter device is adapted and arranged to make a transverse cut at the knee joint of the defeathered whole leg poultry product when the deafeathered whole leg poultry product is in said lifted position, which transverse cut is made from the rear side of the defeathered whole leg poultry product towards the knee cap, which transverse cut extends generally in a direction transverse to the thigh bone and the tibia bone, said transverse cut having a cut end which is located adjacent to the front of the defeathered whole leg poultry product so that the thigh and the drumstick remain connected to each other, by which transverse cut a drumstick side cut plane and a thigh side cut plane are created. The drumstick side cut plane and the thigh side cut plane are connected to each other adjacent to the cut end.

The poultry product that is used as input for the system according to the second aspect of the invention is a defeathered whole leg poultry product. This defeathered whole leg poultry product comprises a thigh, a drumstick and a knee joint. Generally, the part of the leg from the tarsal joint to the foot and the foot itself have already been removed before the system according to the second aspect of the invention starts processing the defeathered whole leg poultry product.

The thigh of the defeathered whole leg poultry product comprises at least a thigh bone and thigh meat. The thigh bone has a knee side end and a hip side end.

The drumstick comprises at least a tibia bone and drumstick meat. The tibia bone has a knee side end and a tarsal joint side end.

The knee joint comprises at least the knee cap and a connection between the thigh and the drumstick.

The defeathered whole leg product has a front side, which is the side on which the knee cap is located, and a rear side, which is the side opposite to the front side.

The defeathered whole leg poultry product is further sometimes in this application referred to as "the leg product" for easier reading. "The leg product" is the same as "the defeathered whole leg poultry product".

The system according to the second aspect of the invention comprises a poultry products conveyor, a leg positioner device and a knee cutter device.

The poultry products conveyor comprises a track and a plurality of poultry product carriers. The poultry product carriers are spaced apart from one another in the direction of the track and are movable along said track in a direction of conveyance. Each poultry product carrier is adapted to hold at least one leg product. The poultry product carrier holds the leg product at or adjacent to the tarsal joint side end thereof such that the leg product is conveyed hanging from said poultry product carrier.

The poultry product carrier is adapted to allow rotation of the leg product about the tibia bone of said leg product and about an axis generally perpendicular to said tibia bone. This can be realized by making that the leg product can rotate relative to the poultry product carrier at least to some extent, e.g. by making that the poultry product carrier has a rather loose grip on the leg product. Alternatively or in addition, the poultry product carrier can be provided with constructional features that allow rotation of the leg product together with at least a part of the poultry product carrier relative to the track, such as a pivot or hinge.

The leg positioner device is adapted to position a single leg product. The leg positioner device is arranged along the track of the poultry products conveyor.

In accordance with the second aspect of the invention, the leg positioner device comprises a thigh stop, a knee positioner with a knee positioner body, and a knee cap lifter.

The thigh stop is adapted and arranged to engage the thigh. Its vertical and horizontal distance from the poultry product carriers of the poultry products conveyor is such that the thigh stop can engage a leg product that is suspended from a poultry product carrier of the poultry products conveyor.

The knee positioner body and the thigh stop are moveable relative to each other between an inactive position and an active position. During this motion, the knee positioner body and the thigh stop both engage the leg product. In the active position, their relative position is such that the leg product has been bent at the knee joint, and the knee joint is in front of the thigh stop. "In front" is related to the front of the leg product.

In the inactive position of the knee positioner body, the distance between the thigh stop and the knee positioner body and their relative position are such that the leg product can be arranged between the thigh stop and the knee positioner body while the leg product is suspended from the poultry product carrier. The knee positioner body and the thigh stop being moveable relative to each other can be achieved by keeping the thigh stop stationary in the leg positioner device and moving the knee positioner body, by keeping the knee positioner body stationary in the leg positioner device and moving the thigh stop, or by moving both the thigh stop and the knee positioner body.

The relative position of the thigh stop and the knee positioner body at the active position makes that the leg product has to bend at the knee. The relative movement of the thigh stop and the knee positioner body together with the possibility for the leg product to rotate with or relative to the poultry product carrier, allows the leg product to assume the bent position with the knee cap facing away from the knee positioner body even if the knee cap did not face away from the knee positioner body entirely when the leg product entered the system according to the second aspect of the invention.

The leg positioner device further comprises a knee cap lifter, which is adapted and arranged to engage the leg product by the knee cap when the knee positioner body and the thigh stop are in the active position and bend the leg product.

The knee cap lifter is moveable between a lower position and an upper position. In the lower position the knee cap lifter engages the knee cap while the leg product is held in the bent position by the knee positioner body and the thigh stop. In the upper position of the knee cap lifter, the leg product is in a lifted position with the knee cap lifter supporting the leg product at the knee cap. In the lifted position, the leg product may or may not be bent.

The system according to the second aspect of the invention further comprises a knee cutter device. This knee cutter device is arranged along the track of the poultry products conveyor.

The knee cutter device is adapted and arranged to make a transverse cut at the knee joint of the leg product when the leg product is in the lifted position. The transverse cut is made from the rear side of the leg product towards the knee cap and extends generally in a direction transverse to the thigh bone and the tibia bone. The transverse cut has a cut end which is located adjacent to the front of the leg product so that the thigh and the drumstick remain connected to each other. By the transverse cut, a drumstick side cut plane and a thigh side cut plane are created. The drumstick side cut plane and the thigh side cut plane are connected to each other adjacent to the cut end.

In a possible embodiment, the knee cap lifter comprises a knee cap engager surface and a thigh engager surface. The thigh engager surface extends under an angle relative to the knee cap engager surface. The thigh engager surface is adapted and arranged to engage front side of the thigh when the leg product is in the bent position. The thigh engager surface provides further support for the leg product when it is lifted by the knee cap lifter and optionally also during the cutting at the knee. It also helps to obtain the bent position when the thigh stop and knee positioner body bend the leg product.

In a possible embodiment, the system further comprises a leg positioner controller for moving the knee positioner body and/or thigh stop from the inactive position to the active position and vice versa.

Optionally, in this embodiment, the leg positioner controller is adapted to move the knee positioner body and/or thigh stop from the inactive position to the active position, back from the active position to the inactive position and again from the inactive position to the active position upstream of the knee cutter device. This way, the knee positioner body and the thigh stop together bend the leg product, release it, and then bend it again. It was found that by doing so, the leg product comes into a bent position with the knee cap facing away from the knee positioner in a reliable way.

In a possible embodiment, the system further comprises a drumstick guide which is adapted and arranged to engage the drumstick in the first and/or lifted position of the leg product. The drumstick guide has a leg contact surface which is arranged at a horizontal offset from the thigh stop in the first horizontal direction. The drumstick guide helps to keep the leg product in the bent and/or lifted position with the knee cap facing away from the knee positioner.

Optionally, the drumstick guide still engages the leg product while the knee cut is made by the knee cutter device.

In a possible embodiment of the system according to the second aspect of the invention, a plurality of leg positioner devices is provided. In general, the leg positioner devices will move along with a carrier of the poultry products conveyor along a part of the track. This allows to obtain higher production rates for the system according to the second aspect of the invention. In a variant of this embodiment, a plurality of leg positioner devices is arranged in a carrousel machine. The knee cutter device can for example be arranged adjacent to the carrousel machines with the leg positioner devices.

In a possible embodiment, a plurality of the leg positioner devices is provided that are arranged in a carrousel machine, which carrousel machine has a vertical rotation axis about which the leg positioners are rotatable. The track of the poultry products conveyor has a curved section which has a radius of curvature and a center of curvature, which center of curvature coincides with the vertical rotation axis of the carrousel machine. In this embodiment, the product cutter is arranged adjacent to said curved section of the track at a horizontal distance from the vertical rotation axis of the carrousel machine that is larger than the radius of curvature of the curved track section.

In a possible embodiment, the knee positioner comprises knee positioner body, e.g. a generally V-shaped knee positioner body, with an opening for receiving the leg product. The knee positioner further comprises a knee positioner arm onto which said knee positioner body is attached, which arm is pivotable about a knee positioner pivot.

Optionally, the opening is generally V-shaped. In practical embodiments, the leg product will be introduced into the V-shaped opening via the wide side of the V-shaped opening. The V-shaped opening helps to bring the leg product in a position in which the knee cap of said leg product faces away from the knee positioner.

The knee positioner arm which is pivotable about a knee positioner pivot allows to push the leg product downward on to the knee cap lifter, thereby ensuring a good grip of the knee lifter onto the lower side of the knee cap.

In a possible embodiment, the leg positioner further comprises a run-in guide for pre-positioning the defeathered whole leg poultry part. The run-in guide comprises a first guide face and a second guide face, which both extend under a relative angle to each other and to the direction of conveyance of the leg product. The friction between the run-in guide and the leg product makes that the leg product is already turned towards a position in which the knee cap faces away from the knee positioner before the knee positioner engages the leg product. In a variant of this embodiment, the first guide face is located upstream in the direction of conveyance relative to the second guide face, and wherein the angle between the first guide face and the direction of conveyance is closer to 90° than the angle between the second guide face and the direction of conveyance.

The second aspect of the invention further pertains to a method for making a knee cut in a leg product, which method comprises the following steps:

providing a leg product, which comprises:
a thigh, which thigh comprises at least a thigh bone and thigh meat, wherein the thigh bone has a knee side end and a hip side end,
a drumstick, which drumstick comprises at least a tibia bone and drumstick meat, wherein the tibia bone has a knee side end and a tarsal joint side end,
a knee joint, which knee joint comprises at least the knee cap and a connection between the thigh and the drumstick, which defeathered whole leg product has a front side, which is the side on which the knee cap is located, and a rear side, which is the side opposite to the front side, arranging the leg product in a poultry products conveyor comprising:
a track,
a plurality of poultry product carriers which are spaced apart from one another in the direction of the track and which are movable along said track in a direction of conveyance, wherein each poultry product carrier is adapted to hold at least one leg product at or adjacent to the tarsal joint side end thereof such that the leg product is conveyed hanging from said poultry product carrier, wherein the poultry product carrier is adapted to allow rotation of the leg product about the tibia bone of said leg product and about an axis generally perpendicular to said tibia bone, conveying the leg product along said track in a direction of conveyance, with the leg product being suspended from the carrier in which it is arranged, along which track a leg positioner device and a knee cutter device are arranged, wherein the leg positioner device comprises a knee positioner with a knee positioner body, and a thigh stop, by using said leg positioner device, bringing said leg product into a bent position by moving the knee positioner and the thigh stop of said leg positioner device relative to each other from an inactive position to an active position, wherein during this motion from the inactive position to the active position, the knee positioner body and the thigh stop both engage the leg product, and in the active position, their relative position is such that the leg product has been bent at the knee joint, and the knee joint is in front of the thigh stop and wherein in the inactive position of the knee positioner body, the distance between the thigh stop and the knee positioner body and their relative position are such that the leg product can be arranged between the thigh stop and the knee positioner body while the leg product is suspended from the poultry product carrier, engaging the leg product by the knee cap with a knee cap lifter when the knee positioner body and the thigh stop are in the active position and the knee positioner and the thigh stop together bend the leg product, and then moving the knee cap lifter from a lower position in which the knee cap lifter first engages the knee cap to an upper position, and wherein in the upper position of the knee cap lifter, the leg product is in a lifted position with the knee cap lifter supporting the leg product at the knee cap, making a transverse cut at the knee joint of the leg product while the defeathered whole leg poultry product is in said lifted position by using a knee cutter device which is arranged along the track of the poultry products conveyor, which transverse cut is made from the rear side of the leg product towards the knee cap, which transverse cut extends generally in a direction transverse to the thigh bone and the tibia bone, said transverse cut having a cut end which is located adjacent to the front of the leg product so that the thigh and the drumstick remain connected to each other, by which transverse cut a drumstick side cut plane and a thigh side cut plane are created.

The method according to the second aspect of the invention can be carried out by the system according to the second aspect of the invention.

In the first step of the method according to the second aspect of the invention, a leg product is provided. The leg product comprises a thigh, a drumstick and a knee joint.

The thigh comprises at least a thigh bone and thigh meat. The thigh bone has a knee side end and a hip side end.

The drumstick comprises at least a tibia bone and drumstick meat. The tibia bone has a knee side end and a tarsal joint side end.

The knee joint comprises at least the knee cap and a connection between the thigh and the drumstick.

The leg product has a front side, which is the side on which the knee cap is located, and a rear side, which is the side opposite to the front side.

In accordance with the method according to the second aspect of the invention, the leg product is arranged in a poultry products conveyor. The poultry products conveyor comprises a track and a plurality of poultry product carriers.

The poultry product carriers are spaced apart from one another in the direction of the track and are movable along said track in a direction of conveyance. Each poultry product carrier is adapted to hold at least one leg product at or adjacent to the tarsal joint side end thereof such that the leg product is conveyed hanging from said poultry product carrier. The poultry product carrier is adapted to allow rotation of the leg product about the tibia bone of said leg product and about an axis generally perpendicular to said tibia bone.

The leg product is conveyed along said track in a direction of conveyance, with the leg product being suspended from the carrier in which it is arranged, along which track a leg positioner device and a knee cutter device are arranged. The leg positioner device comprises a knee positioner with a knee positioner body, and a thigh stop.

By using said leg positioner device, the leg product is brought into a bent position by moving the knee positioner body and the thigh stop of said leg positioner device relative to each other from an inactive position to an active position. During this motion from the inactive position to the active position, the knee positioner body and the thigh stop both engage the leg product. In the active position, their relative position is such that the leg product has been bent at the knee joint, and the knee joint is in front of the thigh stop. "In front" is related to the front of the leg product. In the inactive position of the knee positioner body, the distance between the thigh stop and the knee positioner body and their relative position are such that the leg product can be arranged between the thigh stop and the knee positioner body while the leg product is suspended from the poultry product carrier.

In accordance with the method according to the second aspect of the invention, the knee cap lifter then engages the leg product by the knee cap. When the knee cap lifter engages the leg product, the knee positioner body and the thigh stop are in the active position and the knee positioner and the thigh stop together bend the leg product. Then, the knee cap lifter is moved from a lower position in which the knee cap lifter first engages the knee cap, to an upper position. In the upper position of the knee cap lifter, the leg product is in a lifted position with the knee cap lifter supporting the leg product at the knee cap.

When the leg product in this lifted position, a transverse cut is made at the knee joint of the leg product by using a knee cutter device. The knee cutter device is arranged along the track of the poultry products conveyor. The transverse cut is made from the rear side of the leg product towards the knee cap, and transverse cut extends generally in a direction transverse to the thigh bone and the tibia bone. The transverse cut has a cut end which is located adjacent to the front of the leg product so that the thigh and the drumstick remain connected to each other. By the transverse cut, a drumstick side cut plane and a thigh side cut plane are created that are connected to each other adjacent to the cut end.

In a possible embodiment, the cut end of the transverse cut is located adjacent to the knee cap, on the rear side of the knee cap, so that the knee cap remains intact when the transverse cut is made. This embodiment is suitable for combination with further processing steps to be performed on the leg product that require a complete and/or undamaged knee cap, or for which a complete and/or undamaged knee cap is desirable.

In a possible embodiment of the method according to the second aspect of the invention, the knee positioner body and/or the thigh stop are moved from the inactive position to the active position, back from the active position to the inactive position and again from the inactive position to the active position before the transverse cut at the knee is made. This way, the knee positioner body and the thigh stop together bend the leg product, release it, and then bend it again. It was found that by doing so, the leg product comes into a bent position with the knee cap facing away from the knee positioner in a reliable way.

In a possible embodiment, the method is carried out in a carrousel machine. This carrousel machine has a central vertical rotation axis. In this embodiment, in the bent position and in the lifted position the front side of the leg product faces towards said central vertical rotation axis.

In a possible embodiment, the knee positioner and the thigh stop engage the leg product while the transverse cut in the knee joint is made. This allows to maintain a proper positioning of the leg product during the making of the transverse cut at the knee joint.

In a possible embodiment, a drumstick guide is provided which engages the drumstick in the first and/or lifted position of the leg product. The drumstick guide has a leg contact surface which is arranged at a horizontal offset from the thigh stop in the first horizontal direction. Optionally, the drumstick guide still engages the drumstick of the leg product when the transverse cut at the knee joint is made.

In a possible embodiment, the leg product rotates about the tibia bone relative to the poultry product carrier when the knee positioner engages the leg product during the movement of said knee positioner from the inactive position to the active position.

The invention will be described in more detail below under reference to the drawing, in which in a non-limiting manner exemplary embodiments of the invention will be shown.

Figure 9:
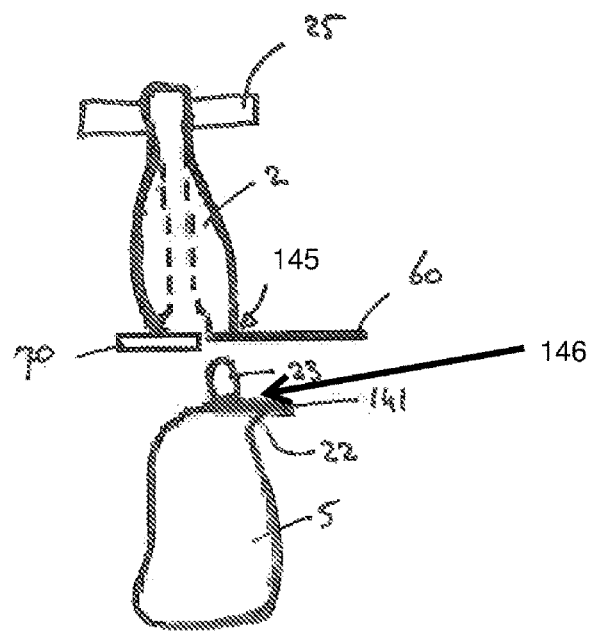
Figure 10:
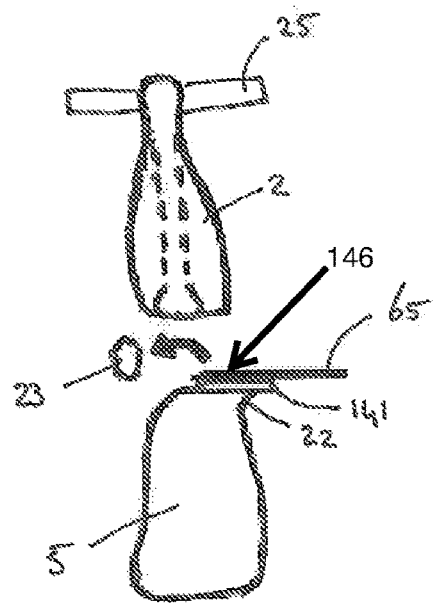
Figure 11:
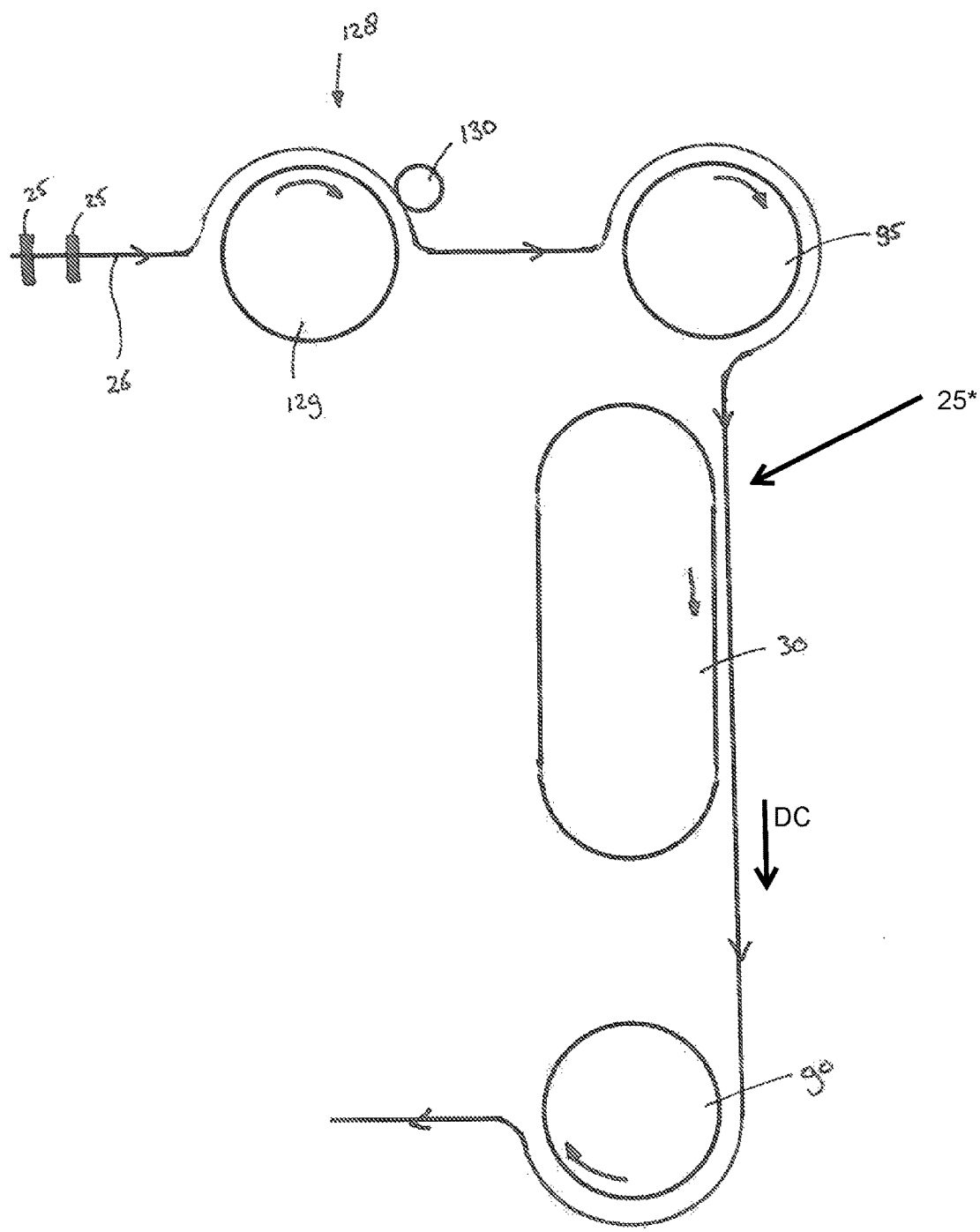

In the drawings:

FIG. 1-10: illustrate an exemplary embodiment of the method according to the invention, FIG. 11: shows a schematic top view of an exemplary embodiment of a system according to the invention.

Figure 24:
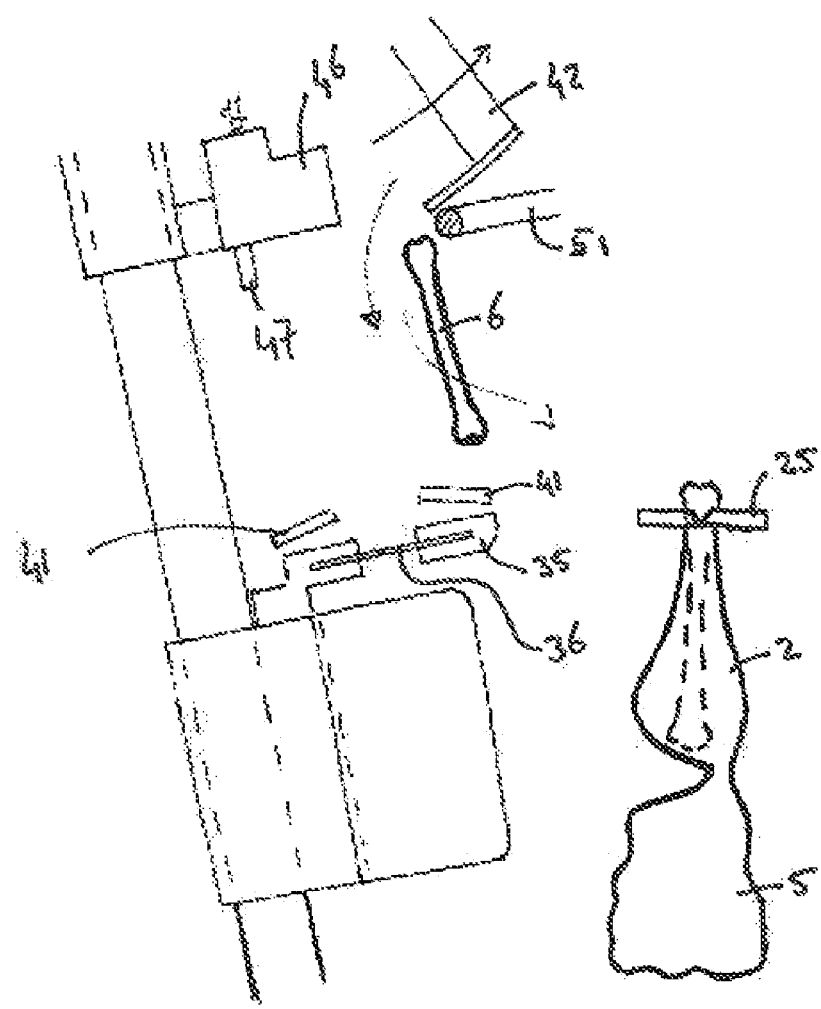
Figure 25:
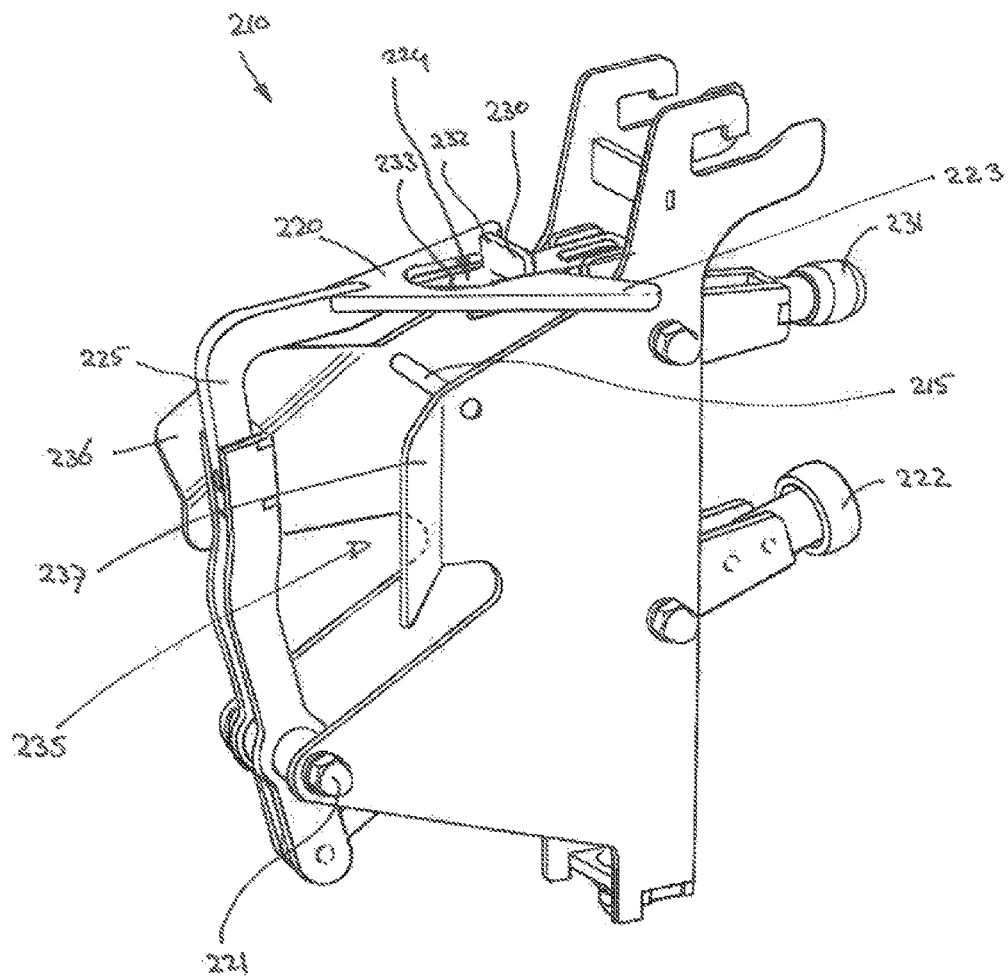
Figure 25A:
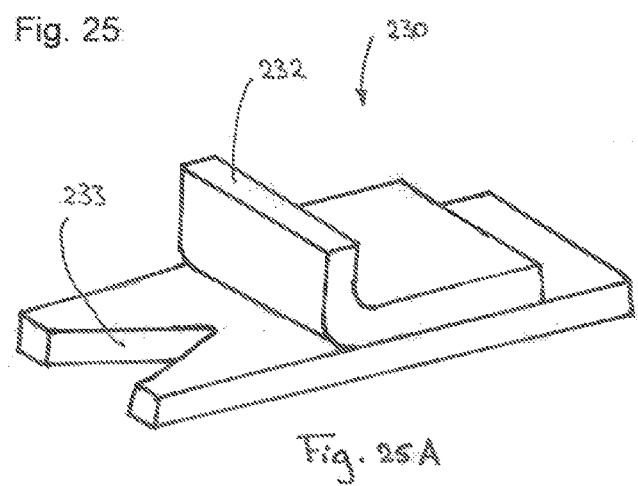

FIG. 12-24: illustrate an exemplary embodiment of a method for removing a thigh bone which can be used in the method according to the first aspect of the invention, FIG. 25: shows an exemplary embodiment of a leg positioner device in accordance with the second aspect of the invention, FIG. 25A: shows the knee cap of FIG. 25 in more detail, FIG. 26-31: illustrate an example of the method according to the second aspect of the invention carried out in an exemplary embodiment of the system according to the second aspect of the invention.

FIG. 1-10 serves to illustrate an exemplary embodiment of the method according to the invention.

FIG. 1 shows a defeathered whole leg poultry product 1 ("leg product 1") as it is provided in the first step of the exemplary embodiment of the method according to the invention that is shown in FIG. 1-10. The leg product comprises a thigh 3, a drumstick 2 and a knee joint 4.

The thigh 3 comprises thigh meat 5 and a thigh bone 6. The thigh bone has a knee side end 7 and a hip side end 8. The thigh bone comprises a knee side condyle 9, which is the thicker bone part at the knee side end 7. In the embodiment of FIG. 1-10, the thigh bone 6 also comprises a hip side condyle 10, which is the thicker bone part at the hip side end 8 of the thigh bone 6.

The drumstick 2 comprises drumstick meat 11 and a tibia bone 12. The tibia bone 12 has a knee side end 13 and a tarsal joint side end 14.

The knee joint 4 comprises a connection 15 between the thigh 3 and the drumstick 2. Optionally, the knee joint 4 further comprises a knee cap 23.

The leg product has a front side 16 and a rear side 17. The front side 16 is the side on which in an unprocessed poultry leg in which the knee joint comprises a knee cap, said knee cap is naturally located. The rear side 17 is the side opposite to the front side 16. Knee meat 22 is present on the front side of the leg product 1, adjacent to the knee cap 23.

Figure 2:
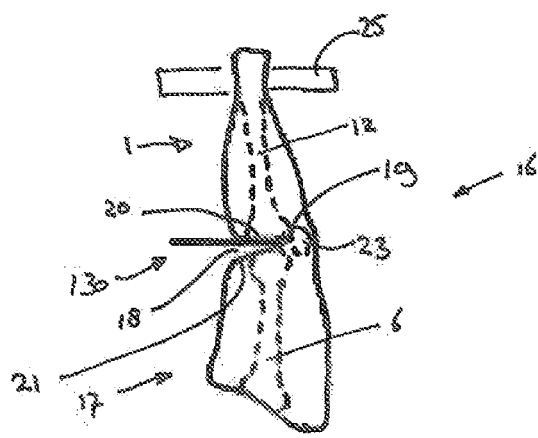

FIG. 2 shows that the leg product 1 is arranged in a poultry product carrier 25, e.g. of an embodiment shown in WO93/13671. The poultry product carrier 25 is part of a poultry products conveyor. The poultry products conveyor comprises a track and a plurality of poultry product carriers 25. The poultry product carriers 25 are spaced apart from one another in the direction of the track and which are movable along said track. Each poultry product carrier 25 is adapted to hold at least one leg product 1, preferably two leg products 1 in a side-by-side arrangement, at the tarsal joint side end thereof such that the leg product is conveyed hanging from said poultry product carrier.

FIG. 2 further shows that a transverse cut 18 is made at the knee joint using a knee cutter device 130. For example, the knee cutter device 130 comprises a circular cutter blade that is rotatable about a shaft. The transverse cut 18 extends generally in a direction transverse to the tibia bone 12 and the thigh bone 6, and from the rear side 17 of the leg product 1 to a cut end 19 which is located adjacent to the rear side of the knee cap 23 so that the thigh 3 and the drumstick 2 remain connected to each other and the knee cap 23 remains intact. By the transverse cut 18, a drumstick side cut plane 20 and a thigh side cut plane 21 are created that are connected to each other adjacent to the cut end 19.

Figure 3:
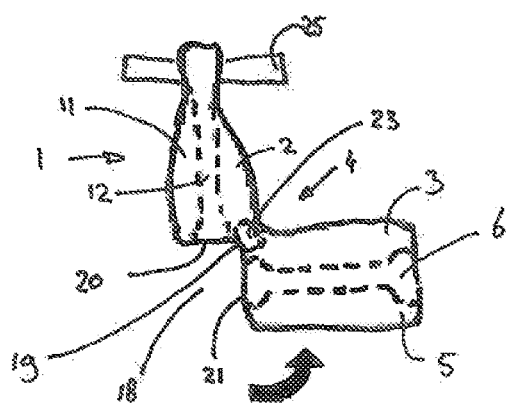

FIG. 3 shows the (optional) method step of changing the angle between the thigh 3 and the drumstick 2 by bending the leg product 1 at the knee joint 4 while keeping the thigh 2 and the drumstick 3 connected to each other. Due to this bending, the transverse cut 18 at the knee joint 4 is opened and the thigh side cut plane 21 becomes exposed. During the bending the thigh meat 5 remains on the thigh bone 6 and the drumstick meat 11 remains on the tibia bone 12.

During this step, in this embodiment, the leg product 1 remains arranged in the poultry product carrier 25 and the thigh 3 and drumstick 2 remain connected to each other.

FIG. 4 shows that a resilient scraper member 35 comprising a central aperture is arranged adjacent to the thigh side cut plane 21 of the transverse cut 18 at the knee joint 4.

The knee side condyle 9 is forced through this central aperture in resilient scraper member 35 by exerting a pushing force on the thigh bone 6, in this case on the hip side end 8 of the thigh bone 6. By pushing the knee side condyle 9 through this central aperture, thigh meat 5 is severed from the knee side condyle 9 of the thigh bone 6.

During this step, in this embodiment, the leg product 1 remains arranged in the poultry product carrier 25 and the thigh 3 and drumstick 2 remain connected to each other.

FIG. 5 shows that, later in the exemplary process, the thigh bone 6 is engaged just behind the knee side condyle 9 with a puller 42.

The puller 42 is then used to exert a pulling force on the thigh bone 6 so that the thigh bone 6 is pulled through the central aperture of the resilient scraper member 35. Preferably, at this stage of the process, the thigh bone is no longer pushed.

The central aperture 36 has a diameter that is variable between a minimum diameter and a maximum diameter, due to the resilience of the resilient scraper member.

In a possible embodiment, the minimum diameter of the central aperture is smaller than the diameter of the thigh bone 6 between the knee side condyle 9 and the hip side condyle 10. In this embodiment, the thigh meat 5 is severed from the thigh bone 6 by the passage thereof through the central aperture of the resilient scraper member 35. However, preferably the minimum diameter of the central aperture is larger than the diameter of the thigh bone 6 between the knee side condyle 9 and the hip side condyle 10. In this embodiment, the resilient scraper member only severs thigh meat from the knee side condyle, and optionally from the hip side condyle.

Alternatively or in addition, a scraper 40 has been provided. In the embodiment shown in FIG. 5, the scraper 40 comprises two scraper elements 41 that are moveable relative to each other with the thigh bone 6 passing between the scraper elements 41 during scraping.

In the variant with the scraper 40, the thigh meat 5 is scraped from a region of the thigh bone 6 between the knee side condyle 9 and the hip side end 8 or hip side condyle 10 using this scraper 40. The thigh meat 5 is scraped from the thigh bone 6 in a scraping direction from the knee side end 7 towards the hip side end 8 of the thigh bone 6.

The thigh meat 5 can be severed from the hip side condyle 10 by the scraper 40 and/or by the central aperture of the resilient scraper member 35.

During this step, in this embodiment, the leg product 1 remains arranged in the poultry product carrier 25 and the thigh 3 and drumstick 2 remain connected to each other.

FIG. 6 shows that the thigh bone 6 has passed through the central aperture of the resilient scraper member 35.

In this stage, there is just a small connection 24 remaining between the thigh meat 5 and thigh bone 6. This connection 24 may comprise meat, ligaments, a tendon or an other type of tissue connection.

To sever this connection 24, a finisher cutter 50 is provided. In the embodiment shown, the finisher cutter 50 is a rotatable disk shaped knife, however other types of cutters (e.g. a stationary knife) can be used as alternatives.

Figure 7:
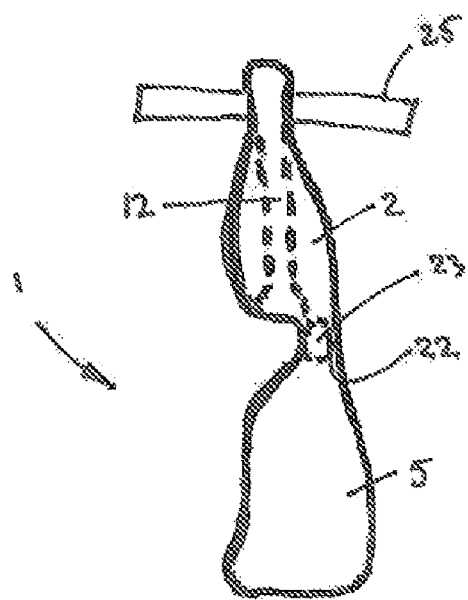

During this step, in this embodiment, the leg product 1 remains arranged in the poultry product carrier 25 and the thigh 3 and drumstick 2 remain connected to each other FIG. 7 shows a subsequent stage of the exemplary embodiment of the method according to the invention.

The thigh bone 6 and the thigh meat 5 are now completely severed from each other; the thigh bone 6 has been removed from the leg product 1. The thigh meat 5 is still connected to the drumstick 2.

The leg product 1 is suspended from in the poultry product carrier 25 and the thigh 3 (which now only includes the thigh meat 5 and no longer the thigh bone 6) and drumstick 2 are still connected to each other.

Figure 8:
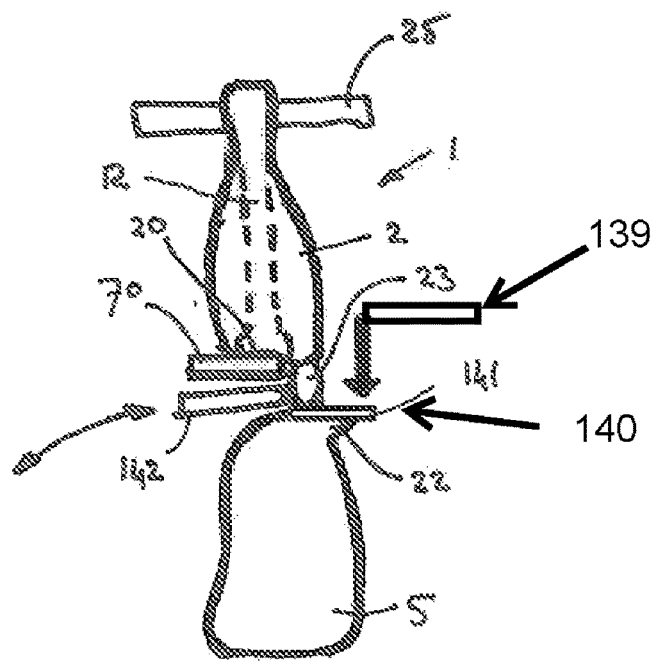

FIG. 8 shows a subsequent stage of the exemplary embodiment of the method according to the invention. Now it is time to harvest the thigh meat 5 together with the knee meat 22. If desired, the knee cap 23 can be harvested as a separate item.

In this embodiment, use is made of a knee meat scraper device 140, which knee meat scraper device 140 which comprises a knee cap scraper 141 and a counter element 142.

In this embodiment, the knee cap scraper 141 which is provided initially engages the front of the leg product adjacent to the knee cap 23, on the drumstick side of said knee cap 23.

The counter element 142 which is provided engages the leg product 142 at or adjacent to the rear of the knee cap 23. The counter element 142 is moveable to and from the leg product 1.

During the scraping of the knee meat 22 from the knee cap 23, the drumstick 2 and the knee cap scraper 141 move relative to each other. The scraping is started when scraping motion device 139 starts moving the drumstick and the knee cap scraper away from each other. In the embodiment shown, the knee cap scraper 141 moves downward relative to the drumstick 2. The counter element 142 makes sure that the knee cap scraper 141 remains in close contact with the leg product 1 during the scraping to ensure effective scraping of the knee meat 22 from the knee cap 23 despite the strong connection between the knee meat 22 and the knee cap 23. The counter element 142 also assists in positioning the drumstick relative to the knee cap scraper 141. As the knee cap 23 is located close to the drumstick 2, it also assists in positioning the knee cap 23 relative to the knee cap scraper 141.

A drumstick support element 70 (in this example in the form of a drumstick support plate) supports the drumstick 2 during the scraping of the knee meat 22 from the knee cap 23. The drumstick support plate 70 also assists in positioning the drumstick relative to the knee cap scraper 141. As the knee cap 23 is located close to the drumstick 2, it also assists in positioning the knee cap 23 relative to the knee cap scraper 141.

As the drumstick support element 70 engages the drumstick at the drumstick side cut plane 20, the positioning of the drumstick 2 relative to the knee cap scraper 141 is independent from the length of the drumstick 2.

The knee cap scraper 141 scrapes in a scraping direction from the drumstick 2 towards the thigh 3. This way, the knee meat 22 remains connected to the thigh meat 5.

FIG. 9 shows a subsequent stage of the exemplary embodiment of the method according to the invention.

Now, the knee meat 22 has been severed from the knee cap 23, but the knee cap is still attached to the thigh 3 and to the drumstick 2. The knee meat 22 is still connected to the thigh meat 5.

The leg product 1 has to be divided into three parts: the drumstick, the knee cap and the thigh (with the knee meat connected to the thigh). This requires severing the drumstick and the knee cap from each other and severing the knee cap and the thigh (including the knee meat 22 that is interconnected with the thigh) from each other.

The knee cap 23 is severed from the drumstick 2 by cutting at a first cutting location 145 which is situated between the knee cap 23 and the drumstick 2. To effect this cutting, a drumstick—knee cap separator 60 is provided.

The drumstick—knee cap separator 60 can for example be a disk-shaped rotatable knife or a stationary knife.

FIG. 10 shows a subsequent stage of the exemplary embodiment of the method according to the invention.

The knee cap 23 is now severed from the thigh 3 (including the knee meat 22) by cutting at a second cutting location 146 which is situated between the knee cap 23 and the thigh 3, adjacent to the knee cap scraper 41. During this severing, the knee meat 23 and the thigh 5 remain interconnected. To effect this cutting, a knee cap—thigh separator 65 is provided (see FIG. 15).

The knee cap—thigh separator 65 can for example be a disk-shaped rotatable knife or a stationary knife.

Alternatively, an edge of the knee cap scraper 141 and/or an edge of the counter element 142 are sharp. When in this embodiment the counter element 142 and the knee cap scraper 141 are moved closer towards each other than the relative position shown in FIG. 8, with the edge of the knee cap scraper 141 passing over the edge of the counter element 142, the knee cap is severed from the interconnected thigh meat 5 and knee meat 22 in a scissors-like action. In this embodiment no rotating or stationary knife is required to sever the knee cap from the interconnected thigh meat 5 and knee meat 22. The edge of the knee cap scraper 141 and the edge of the counter element 142 together act as the knee cap—thigh separator 65 in this embodiment.

In the embodiment shown in FIG. 10, the second cutting location 146 is located on the second side of the knee cap scraper 141, so on the side of the knee cap 23. This way, the knee cap scraper 141 shields the thigh 3 and the knee meat 23 from accidental damage by the knee cap—thigh separator 65 when severing the knee cap 23 from the thigh 3 and knee meat 23. In an alternative embodiment, the second cutting location 146 is located on the first side 43 of the knee cap scraper 41, so on the side of the thigh 3 and the knee meat 23.

The leg product 1 has now been divided into three parts: the drumstick, the knee cap and the thigh (with the knee meat connected to the thigh).

FIG. 11 shows a schematic top view of an exemplary embodiment of a system according to the invention.

The system comprises a poultry products conveyor 25\* with a track 26 and a plurality of poultry product carriers 25 at regular intervals along the track 26, e.g. as in WO93/13671, of which two are schematically indicated in FIG. 11. The poultry product carriers 25 are spaced apart from one another in the direction of the track 26 (indicated by the arrows) and which are movable along said track in a direction of conveyance DC. Each poultry product carrier 25 is adapted to hold at least one leg product 1 at the tarsal joint side end thereof such that the leg product is conveyed hanging from said poultry product carrier.

The exemplary embodiment of the system that is shown in FIG. 11 further comprises a knee cutter device 130, a thigh bone remover device 30 and a knee meat and thigh meat harvester device 90. These are all arranged along the track 26. The exemplary embodiment of the system that is shown in FIG. 11 further comprises a thigh deskinner device 95 which is also arranged along the track 26.

The knee cutter device 130 forms part of a system 128 for making a knee cut in a leg product. This system further comprises a plurality of leg positioner devices which are arranged in a carrousel machine 129. The system 128 for making a knee cut in a leg product is for example a system in accordance with the second aspect of the invention.

In the exemplary embodiment of the system that is shown in FIG. 11, the thigh deskinner device 95, the thigh bone remover device 30 and the knee meat and thigh meat harvester device 90 are all designed as carrousel machine. They all have processing devices and/or positioning devices which are moveable along a loop-shaped path, e.g. a circular path, an elliptical path or a path made up out of a combination of straight lines and curved lines. These processing devices and/or positioning devices move along with the poultry product carriers 25 of the poultry product conveyor when the poultry product carriers 25 move past the knee cutter device 130, the thigh deskinner device 95, the thigh bone remover device 30 and the knee meat and thigh meat harvester device 90, respectively.

FIG. 12-24 show an exemplary embodiment of a method for removing a thigh bone which can be used in the method according to the first aspect of the invention.

Figure 12:
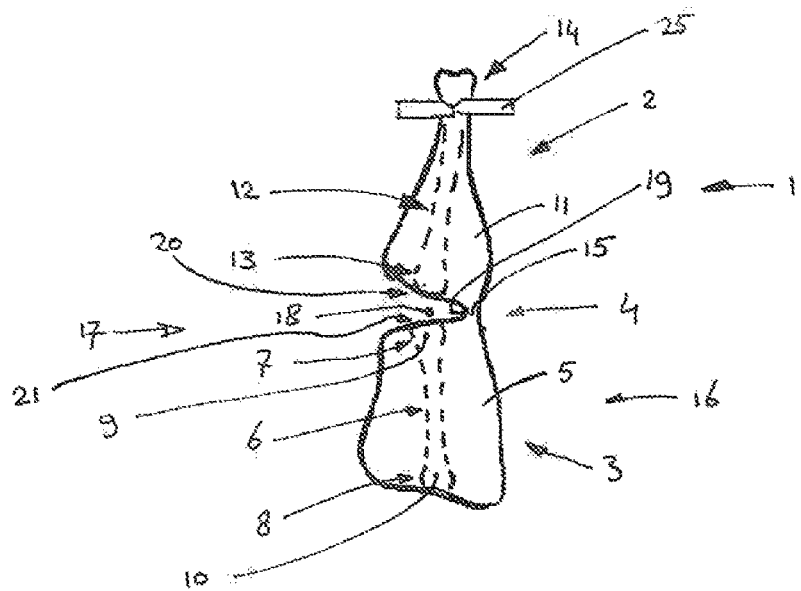

FIG. 12 shows a defeathered whole leg poultry product 1 ("leg product 1") as it is provided in the first step of the exemplary embodiment of the method according to the invention that is shown in FIG. 12-24. This leg product comprises a thigh 3, a drumstick 2 and a knee joint 4.

The thigh 3 comprises thigh meat 5 and a thigh bone 6. The thigh bone has a knee side end 7 and a hip side end 8. The thigh bone comprises a knee side condyle 9, which is the thicker bone part at the knee side end 7. In the embodiment of FIG. 12-24, the thigh bone 6 also comprises a hip side condyle 10, which is the thicker bone part at the hip side end 8 of the thigh bone 6.

The drumstick 2 comprises drumstick meat 11 and a tibia bone 12. The tibia bone 12 has a knee side end 13 and a tarsal joint side end 14.

The knee joint 4 comprises a connection 15 between the thigh 3 and the drumstick 2. Optionally, the knee joint 4 further comprises a knee cap (not shown in FIG. 12).

The leg product has a front side 16 and a rear side 17. The front side 16 is the side on which in an unprocessed poultry leg in which the knee joint comprises a knee cap, said knee cap is naturally located. The rear side 17 is the side opposite to the front side 16.

In the leg product, a transverse cut 18 has been provided at the knee joint 4. The transverse cut 18 extends generally in a direction transverse to the thigh bone 6 and the tibia bone 12. As can be seen in FIG. 12, the transverse cut 18 extends from one side of the leg product 1 to a cut end 19 which is located adjacent to the opposite side of the leg product 1 so that the thigh 3 and the drumstick 2 remain connected to each other. By the transverse cut 18, a drumstick side cut plane 20 and a thigh side cut plane 21 are created. They are connected to each other adjacent to the cut end 19.

In the embodiment shown in FIG. 12-24, the transverse cut 18 extends from the rear side 17 of the leg product 1 to a cut end 19 which is located adjacent to the front side 16 of the leg product 1. In case a knee cap is still present, the cut end 19 may be located adjacent to the rear of the knee cap, so that the knee cap remains intact or at least generally intact.

FIG. 12 further shows that the leg product is arranged in a poultry product carrier 25. The poultry product carrier 25 is part of a poultry products conveyor. The poultry products conveyor comprises a track and a plurality of poultry product carriers 25. The poultry product carriers 25 are spaced apart from one another in the direction of the track and which are movable along said track. Each poultry product carrier 25 is adapted to hold at least one leg product 1 at the tarsal joint side end thereof such that the leg product is conveyed hanging from said carrier.

Figure 13:
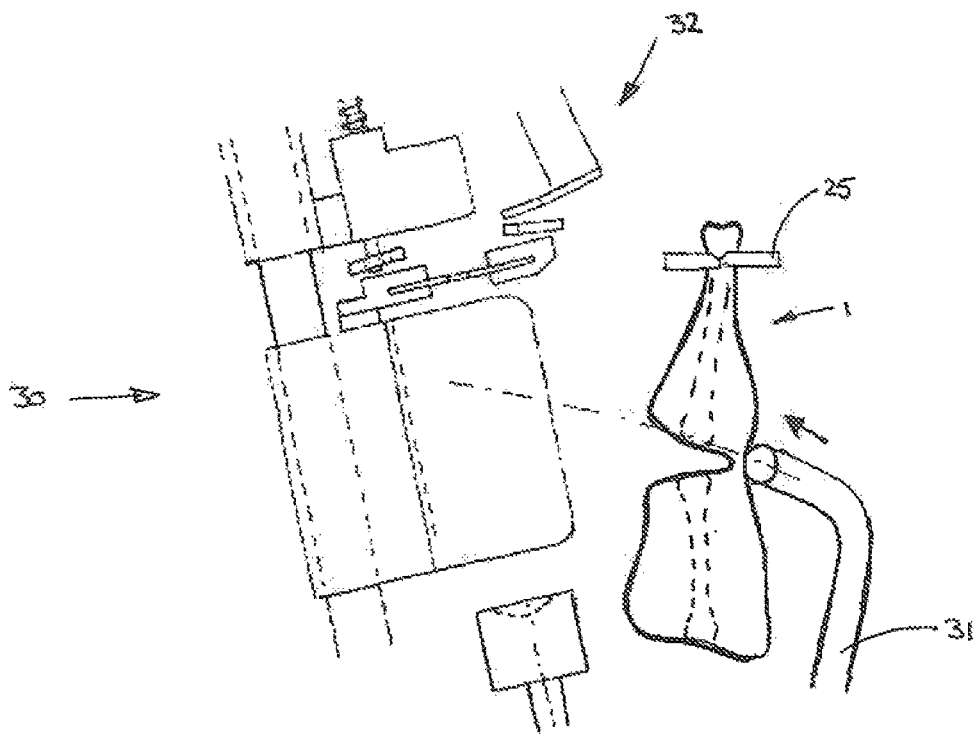

FIG. 13 shows that the leg product 1 is arranged adjacent to an embodiment of a thigh bone remover device 30 according to the invention. The thigh bone remover device 30 comprises a bender device 31 and a thigh bone remover assembly 32.

In this embodiment, the bender device engages the leg product 1 in the vicinity of the connection 15 between the thigh 3 and the drumstick 2, here at the front side of the leg product, but other locations can be suitable for engagement by the bender device 31 as well.

In this embodiment, the bender device 31 brings the leg product 1 towards the thigh bone remover assembly 32. Meanwhile, the leg product 1 remains arranged in poultry product carrier 25.

Figure 14:
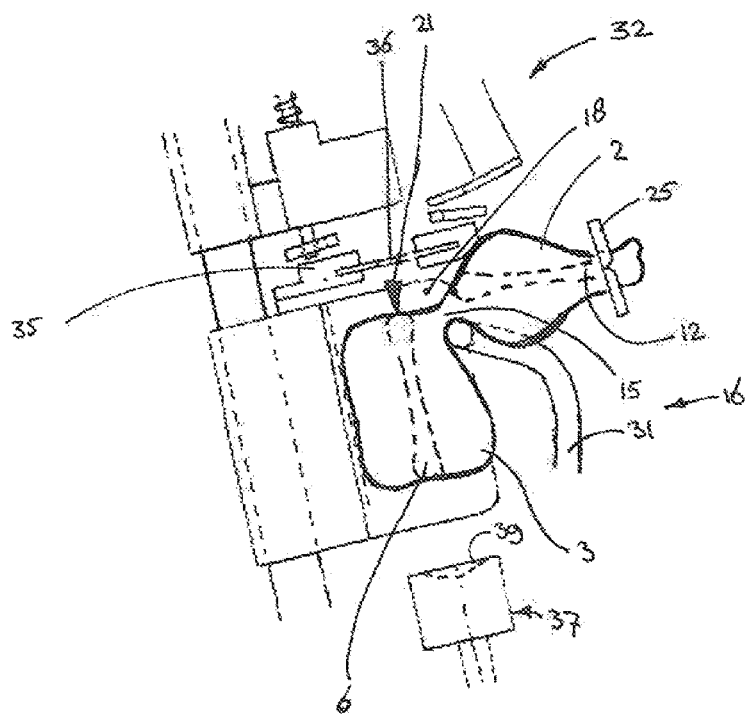

FIG. 14 shows a subsequent stage of the exemplary embodiment of the method according to the invention.

FIG. 14 shows that the bender device 31 has changed the angle between the thigh 3 and the drumstick 2 by bending the leg product 1 at the knee joint 4. Due to this bending, the transverse cut 18 is opened and the thigh side cut plane 21 has become exposed. During this bending the thigh 3 and the drumstick 2 remained connected to each other via connection 15 of the knee joint 4. Furthermore, during this bending—which occurs when the leg product 1 is transferred from the position shown in FIG. 13 to the bent position shown in FIG. 14—, the thigh meat 5 remains on the thigh bone 6 and the drumstick meat 11 remains on the tibia bone 12.

As is shown in FIG. 14, the leg product 1 is in the bent position arranged adjacent to the thigh bone remover assembly 32.

The thigh bone remover assembly 32 comprises a resilient scraper member 35 with a central aperture 36. The exposed thigh side cut plane 21 is arranged adjacent to this resilient scraper member, preferably already with the thigh bone 6 more or less aligned with the central aperture 36.

The central aperture 36 has a diameter that is variable between a minimum diameter and a maximum diameter due to the resilient properties of the scraper member 35. The central aperture 36 is biased towards its minimum diameter, so if no external forces are exerted onto the central aperture 36, the central aperture 36 will have a diameter that equals the minimum diameter. So, when the resilient scraper member 35 is not scraping, the diameter of the central aperture 36 will equal the minimum diameter. The minimum diameter of the central aperture 36 is smaller than the maximum diameter of the knee side condyle 9. In the embodiment shown in FIG. 12-24, the minimum diameter of the central aperture 36 is larger than the thickness of the thigh bone 6 in the region between the knee side condyle 9 and the hip side condyle 10. In embodiments in which leg products are processed of which the thigh bone 6 does not comprise a hip side condyle, optionally the minimum diameter of the central aperture 36 is larger than the thickness of the thigh bone 6 in the region between the knee side condyle 9 and the hip side end 8.

The thigh bone remover assembly 32 further comprises a thigh bone displacement assembly 37. The leg product 1 is arranged with the thigh 3 between the resilient scraper member 35 with the central aperture 36 and the thigh bone displacement assembly 37. The thigh bone displacement assembly 37 is located adjacent to the hip side end 8 of the thigh bone 6. The function of the thigh bone displacement assembly 37 is to force the thigh bone 6 through the central aperture 36 while the transverse cut 18 at the knee joint 4 is kept open and the thigh 3 and the drumstick 2 are kept connected to each other.

In the exemplary embodiment shown in FIG. 12-24, in the bent position, the thigh bone 6 extends substantially vertically while the tibia bone 12 extends substantially horizontally. Initially the tibia bone 12 extended substantially vertically, as can be seen in FIG. 12 and FIG. 13. The changing of orientation of the tibia bone 12 from vertical to horizontal is facilitated by the carrier 25, which a pivot (not shown) that allows to pivot the leg product 1 about a horizontal pivot axis when bending the leg product 1.

As can be seen in FIG. 14, in this exemplary embodiment, the bender device 31 is adapted to rotate the drumstick 2 relative to the thigh 3 about the connection 15 at the knee joint 4 to a bent position in which the smallest angle between the thigh 3 and the drumstick 2 is on the front side 16 of the leg product 1.

Figure 15:
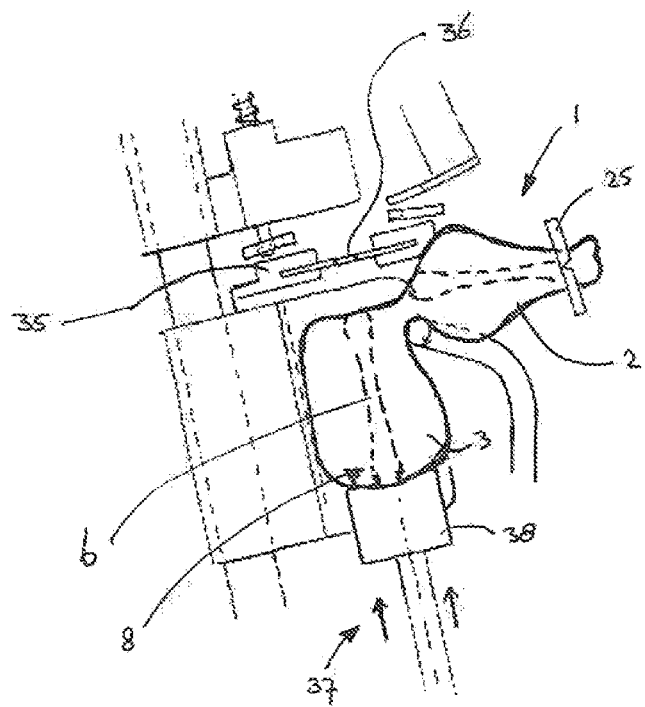

FIG. 15 shows a subsequent stage of the exemplary embodiment of the method according to the invention.

In the embodiment shown in the FIG. 12-24, the thigh bone displacement assembly 37 comprises a pusher 38, here in the form of a moveable pusher block. In the stage of the exemplary embodiment of the method according to the invention that is shown in FIG. 15, the pusher 38 moves towards the thigh 3 of the leg product 1 until it engages the thigh 3 on the hip side. The transverse cut 18 is still opened and the thigh 3 and the drumstick 2 are still connected to each other.

Optionally, the pusher 38 comprises a recess 39 (see FIG. 14) at the side facing the hip side end of the thigh bone. The recess 39 has slanting walls, it is e.g. a generally half-spherical or conical recess. As the thigh bone 6 will provide the strongest resistance when the pusher 38 forces the thigh 3 against the resilient scraper member 35 with the central aperture 36, the hip side end 8 of the thigh bone 6 will assume a position in which said hip side end 8 is located in the deepest part of the recess 39 that it can get into. In the embodiment shown, the pusher 38 is arranged with the deepest part of the recess 39 in line with the center of the central aperture 36 as seen in the direction in which the pusher 38 is moveable. Therewith, the thigh bone 6 will be pushed through the central aperture 36 in a straight line without resulting transverse forces being exerted on the thigh bone 6.

Figure 16:
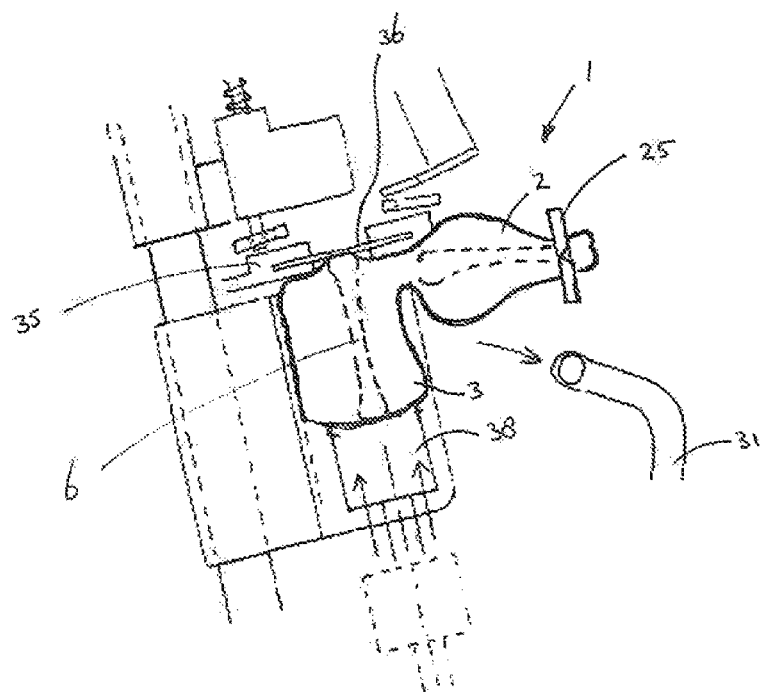

FIG. 16 shows a subsequent stage of the exemplary embodiment of the method according to the invention.

In the stage of the exemplary embodiment of the method according to the invention that is shown in FIG. 16, the pusher 38 moves further towards the resilient scraper member 35 with the central aperture 36. The pusher 38 takes the thigh 3 with it, and pushes the thigh 3 against the resilient scraper member 35 with the central aperture 36. The transverse cut 18 is still opened and the thigh 3 and the drumstick 2 are still connected to each other.

When the thigh 3 is engaged by both the resilient scraper member 35 and by the pusher 38, the bender device 31 can be disengaged and moved away from the leg product 1. Alternatively, it is however possible that the bender device 31 remains in contact with the leg product 1.

Figure 17:
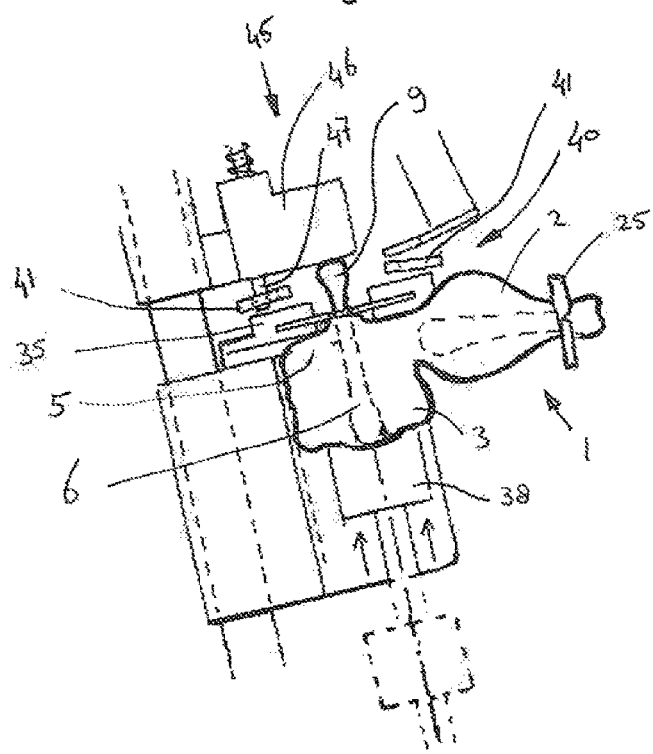

FIG. 17 shows a subsequent stage of the exemplary embodiment of the method according to the invention.

In the stage of the exemplary embodiment of the method according to the invention that is shown in FIG. 17, the pusher 38 moves further towards the resilient scraper member 35 with the central aperture 36. Now, the distance between the pusher 38 and the resilient scraper member 35 with the central aperture 36 is shorter than the length of the thigh bone 6, and the thigh bone is forced into the central aperture 36 and through the resilient scraper member 35 by the pusher 38.

The central aperture 36 has a minimum diameter that is smaller than the maximum diameter of the knee side condyle 9. The knee side condyle 9 forces the diameter of the central aperture 36 to become larger, so that the knee side condyle 9 can pass through. As the central aperture 36 is biased towards its minimum diameter, this causes the edges of the central aperture 36 to lie closely and under some pressure against the knee side condyle 9, and to closely follow the shape of the knee side condyle 9. Therewith, the central aperture 36 severs thigh meat 5 from the knee side condyle 9 in an effective manner. The thigh meat 5 remains generally between the resilient scraper member 35 and the pusher 38.

During all this, the transverse cut 18 is still opened and the thigh 3 and the drumstick 2 are still connected to each other.

In the embodiment of FIG. 12-24, right behind the resilient scraper member 35 with the central aperture 36, on the opposite side of where the pusher 38 is located, a scraper 40 is arranged. In the embodiment shown, the scraper 40 comprises two scraper elements 41.

While the knee side condyle 9 is forced through the central aperture 36, the scraper 40 is in its inactive state. In the inactive state, the scraper elements are arranged at a distance from the thigh bone 6, so that they do not engage the thigh bone 6.

In the embodiment of FIG. 12-24, a scraper activator 45 is provided. The scraper activator 45 in this embodiment comprises a movable block 46 with a locking pin 47. The locking pin 47 is fixed to the moveable trigger block 46. The moveable trigger block 46 is arranged in the path of the thigh bone 6 when it is moved by the pusher 38. The locking pin 47 holds the scraper 40 in its inactive position, by locking the scraper elements 41 in a position away from the thigh bone 6. Optionally a separate locking pin is provided for each scraper element 41. Alternatively, the scraper elements 41 are connected to each other, e.g. by gear toothing, to move together (e.g. towards each other or away from each other). In that case, a single locking pin 47 is sufficient.

Figure 18:
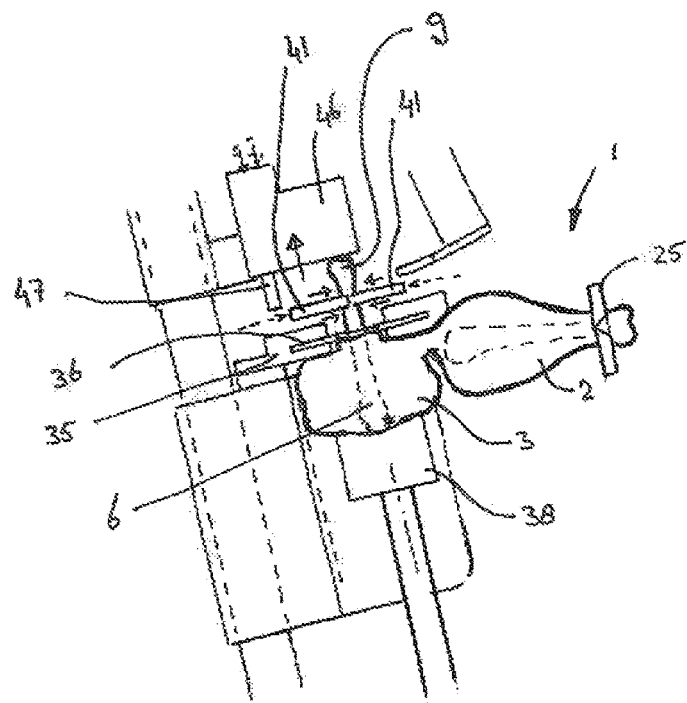

FIG. 18 shows a subsequent stage of the exemplary embodiment of the method according to the invention.

In the stage of the exemplary embodiment of the method according to the invention that is shown in FIG. 18, the pusher 38 moves further towards the resilient scraper member 35 with the central aperture 36. Now, the knee side condyle 9 has been forced through the central aperture 36 entirely.

The knee side condyle 9 protrudes so far through the central aperture 36 that it engages the moveable trigger block 46 of the scraper activator 45. As the pusher 38 pushes the thigh bone 6 further through the central aperture 36, the knee side condyle 9 moves the moveable trigger block 46 away from the resilient scraper member 35 with the central aperture 36. By this movement of the moveable trigger block 46, the locking pin 47 becomes disengaged from the scraper 40.

In this embodiment, the scraper 40 is biased towards it active position. So, when the locking pin 47 releases the scraper 40, the scraper 40 gets into its active position, with the scraper elements 41 engaging the thigh bone between the knee side condyle 9 and the hip side end 8.

So, in the embodiment shown in FIG. 12-24, the knee side condyle 9 of the thigh bone 6 operates the scraper 40. The scraper 40 only becomes active after the thigh bone 6 already protrudes through the central aperture over a certain, predetermined protrusion trigger length. Alternatively, the length over which the thigh bone 6 protrudes through the central aperture 36 can for example be detected by a sensor or switch, which then activates the scraper 40 once the predetermined protrusion trigger length has been reached.

The thigh meat that is already severed from the thigh bone 6 generally remains in the area between the resilient scraper member 35 with the central aperture 36 and the pusher 38. The resilient scraper member 35 with the central aperture 36 prevents that severed thigh meat gets caught between the scraper elements 41, and therewith prevents damage to the thigh meat.

During all this, the transverse cut 18 is still opened and the thigh 3 and the drumstick 2 are still connected to each other.

Figure 19:
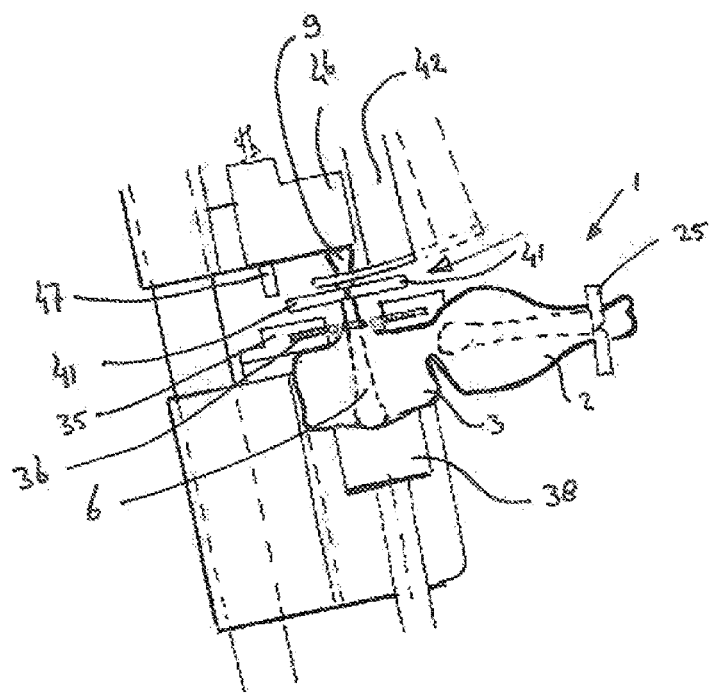

FIG. 19 shows a subsequent stage of the exemplary embodiment of the method according to the invention.

In the stage of the exemplary embodiment of the method according to the invention that is shown in FIG. 19, the pusher 38 moves further towards the resilient scraper member 35 with the central aperture 36. Now, the knee side condyle 9 has been forced through the central aperture 36 entirely, and also a part of the thigh bone 6 between the knee side condyle 9 and the hip side condyle 10 has passed through the central aperture 36 of the resilient scraper member 35.

In the embodiment shown in FIG. 12-24, the minimum diameter of the central aperture 36 is larger than the diameter of the thigh bone 6 in the region between the knee side condyle 9 and the hip side condyle 10. So, the central aperture 36 does not sever thigh meat from the thigh bone in the region between the knee side condyle 9 and the hip side condyle 10. In this region, the thigh meat is severed from the thigh bone 6 by the scraper 40.

When the stage of the exemplary embodiment of the method according to the invention that is shown in FIG. 19 is reached, a little of the thigh bone 6 behind the knee side condyle has passed through the scraper 40. So, there now is some space between the scraper elements 41 of the scraper 40 and the knee side condyle 9.

In the embodiment shown in FIG. 12-24, the thigh bone remover assembly further comprises a puller 42. The puller 42 is adapted to exert a pulling force on the thigh bone 6 in order to move the thigh bone 6 relative to the scraper 40.

The puller 42 has been in an inactive state during the method stages shown in FIG. 12-18, but now it is transferred into its active state, in which it engages the thigh bone 6 just behind the knee side condyle 9.

During all this, the transverse cut 18 is still opened and the thigh 3 and the drumstick 2 are still connected to each other.

Figure 20:
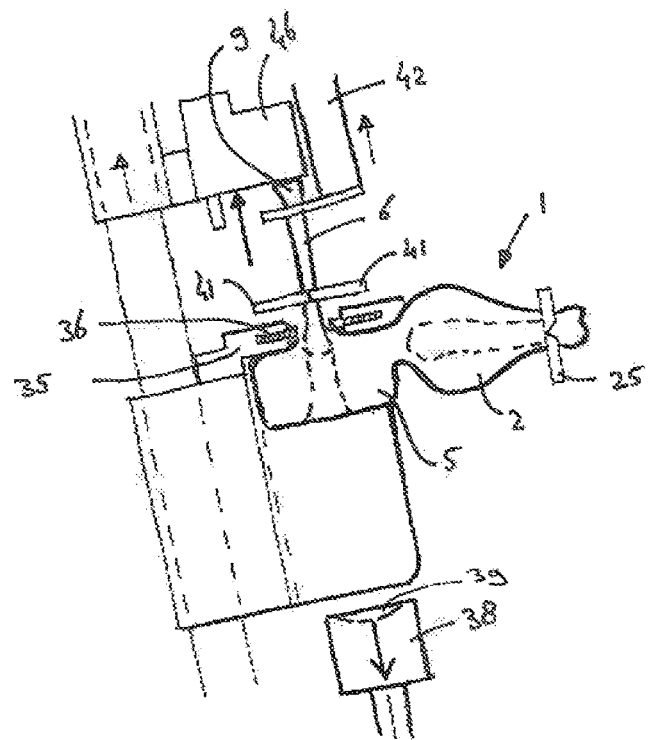

FIG. 20 shows a subsequent stage of the exemplary embodiment of the method according to the invention.

In the stage of the exemplary embodiment of the method according to the invention that is shown in FIG. 20, the puller 42 takes the task of moving the thigh bone 6 relative to the scraper 40 over from the pusher 38. The pusher 38 can now be returned to its initial position, and is moved away from the resilient scraper member 35 with the central aperture 36.

The puller 42 pulls the thigh bone 6 through the scraper 40 until the hip side condyle 10 reaches the scraper elements 41. The scraper 40 severs the thigh meat from the thigh bone in the region between the knee side condyle 9 and the hip side condyle 10. The thigh meat 5 that is severed from the thigh bone remains in the area between the resilient scraper member 35 with the central aperture 36 and the pusher 38.

In case a leg product 1 is processed of which the thigh bone does not contain a hip side condyle, the scraper 40 can scrape the thigh meat from the thigh bone all the way to the hip side end of the thigh bone.

During all this, the transverse cut 18 is still opened and the thigh 3 and the drumstick 2 are still connected to each other.

Figure 21:
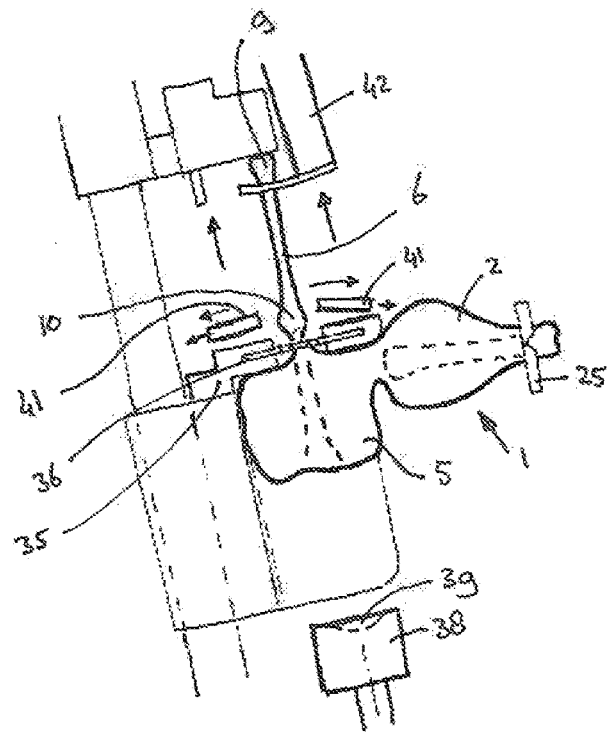

FIG. 21 shows a subsequent stage of the exemplary embodiment of the method according to the invention.

In the stage of the exemplary embodiment of the method according to the invention that is shown in FIG. 21, the puller 42 moves the thigh bone further relative to the scraper 40. The scraper elements 41 are moved away from each other in order to allow the hip side condyle 10 to pass. The puller 42 pulls the hip side condyle 10 through the central aperture 36.

In the embodiment shown in FIG. 12-24, the diameter range of the central aperture 36 is selected such that the central aperture severs thigh meat from the hip side condyle 10 in the same way as in which it severed thigh meat from the knee side condyle 9.

In an alternative embodiment, the scraper elements 41 move away from each other just enough to let the hip side condyle 10 pass through, however still maintaining engagement with the thigh bone, so the scraping action can be maintained to the hip side end 8 of the thigh bone 6.

Figure 22:
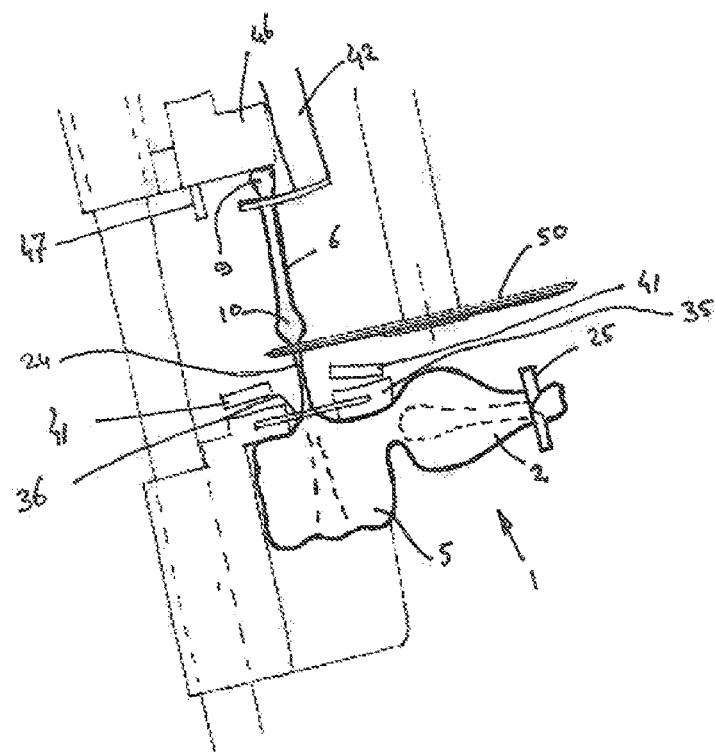

FIG. 22 shows a subsequent stage of the exemplary embodiment of the method according to the invention.

In the stage of the exemplary embodiment of the method according to the invention that is shown in FIG. 22, the puller 42 moves the thigh bone further relative to the scraper 40. In this stage, there is just a small connection 24 remaining between the thigh meat 5 and thigh bone 6. This connection 24 may comprise meat, ligaments, a tendon or an other type of tissue connection.

To sever this connection 24, a finisher cutter 50 is provided. In the embodiment shown, the finisher cutter 50 is a rotatable disk shaped knife, however other types of cutters (e.g. a stationary knife) can be used as alternatives.

Figure 23:
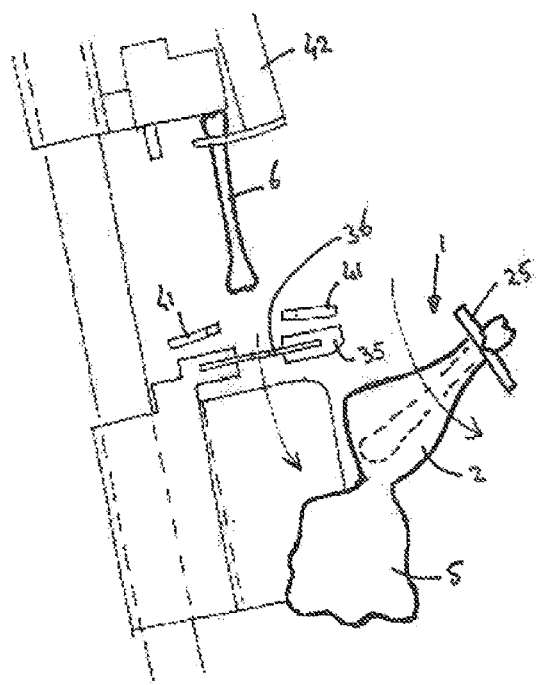

FIG. 23 shows a subsequent stage of the exemplary embodiment of the method according to the invention.

The thigh bone 6 and the thigh meat 5 are now completely severed from each other. The thigh meat 5 is still connected to the drumstick 2.

The drumstick 2 can now return to a substantially vertical position, due to the pivot in the poultry product carrier.

FIG. 24 shows a subsequent stage of the exemplary embodiment of the method according to the invention.

The embodiment shown comprises a knock out device 51, which engages the severed thigh bone 6 which is still engaged by the puller. Due to the action of the knock out device 51, the thigh bone 6 is released from the puller 42.

The second aspect of the invention pertains to system and method for making a knee cut.

For making an accurate knee cut, a good positioning of the knee joint relative to a knee cutter device that makes the actual cut at the knee joint is desired. The system according to the second aspect of the invention comprises a leg positioner device that is adapted to position a single leg product 1 relative to the knee cutter device.

FIG. 25 shows an exemplary embodiment of a leg positioner device 210 in accordance with the second aspect of the invention. The leg positioner device 210 comprises a thigh stop 215, a knee positioner 220 and a knee cap lifter 230.

This embodiment of a leg positioner device 210 is for example suitable for positioning a leg product such as shown in FIG. 1.

The thigh stop 215 is adapted and arranged to engage the thigh 3.

The knee positioner 220 comprises a generally V-shaped knee positioner body 223 with an opening 224 for receiving the leg product 1, and a knee positioner arm 225 onto which said knee positioner body 223 is attached. The knee positioner arm 225 is pivotable about the knee positioner pivot 221.

The thigh stop 215 and the knee positioner body 223 are moveable relative to each other between an inactive position and an active position.

In the embodiment shown in FIG. 25, the thigh stop 215 is arranged stationary in the leg positioner device 210 and the knee positioner body 223 is pivotable about knee positioner pivot 221.

A cam roller 222 is provided that is connected to the knee positioner body 223 for moving the knee positioner body 223 from the inactive position to the active position and from the active position to the inactive position. The cam roller 222 is part of a leg positioner controller.

The knee cap lifter 230 is adapted and arranged to engage the leg product 1 by the knee cap 23 when the knee positioner 220 and the thigh stop 215 are in the active position. The knee cap lifter 230 is moveable between a lower position and an upper position. A second cam roller 231 is provided that is connected to the knee cap lifter 230 for moving the knee cap lifter 230 from the lower position to the upper position and from the upper position to the lower position. FIG. 25 shows the knee cap lifter in the upper position.

The knee cap lifter 230 comprises a knee cap engager surface 232 and a thigh engager surface 233, which thigh engager surface 233 extends under an angle relative to the knee cap engager surface 232. FIG. 25A shows the knee cap lifter 230 in more detail.

In the embodiment shown in FIG. 25, the leg positioner device 210 further comprises the leg positioner further comprises a run-in guide 235 for pre-positioning the leg product. The run-in guide 35 comprises a first guide face 36 and a second guide face 36, which both extend under a relative angle to each other and to the direction of conveyance of the leg product 1.

The first and second cam rollers 231 and 222 are each engaged with a corresponding cam track of a cam track body, e.g. stationary cam track body with the leg positioner device 210 moving synchronous with the carrier 25 and product 1 relative to the cam track body. For example the cam track body is part of a carrousel machine provided with multiple leg positioner devices 210 with the track of the carriers 25 forming a semi-circular track section adjacent to the carrousel machine.

FIG. 26-FIG. 31 show an example of the method according to the second aspect of the invention carried out in an exemplary embodiment of the system according to the second aspect of the invention.

The method starts with providing a defeathered whole leg poultry product 1 ("leg product 1"). This leg product comprises a thigh 3, a drumstick 2 and a knee joint 4. Generally, the part of the leg from the tarsal joint to the foot and the foot itself have already been removed before the system according to the second aspect of the invention starts processing the leg product 1.

The thigh 3 of the leg product comprises at least a thigh bone 6 and thigh meat 5. The thigh bone 6 has a knee side end 7 and a hip side end 8.

The drumstick 2 comprises at least a tibia bone 12 and drumstick meat 11. The tibia bone 12 has a knee side end 13 and a tarsal joint side end 14.

The knee joint 4 comprises at least the knee cap 23 and a connection 15 between the thigh 3 and the drumstick 2.

The leg product 1 has a front side 16, which is the side on which the knee cap 23 is located, and a rear side 17, which is the side opposite to the front side 16.

FIG. 1 shown an example of such a leg product 1.

The leg product 1 is arranged in a poultry product carrier of a poultry products conveyor. This poultry products conveyor has a track and a plurality of poultry product carriers 25. The poultry product carriers 25 are spaced apart from one another in the direction of the track and which are movable along said track. Each poultry product carrier 25 is adapted to hold at least one leg product 1 at the tarsal joint side end thereof such that the leg product is conveyed hanging from said poultry product carrier.

The poultry product carrier is adapted to allow rotation of the leg product about the tibia bone of said leg product and about an axis generally perpendicular to said tibia bone. For example the product is held with some play in a part of the carrier allowing for the rotation about the tibia bone and with said part being hinged about a horizontal axis relative to a trolley part of the carrier that is mounted on a rail forming the track of the conveyor.

An example of such a poultry product carrier is shown in e.g. WO93/13671.

For example two product may be suspended from a common carrier, e.g. as possible with the WO93/13671 carrier.

Figure 26:
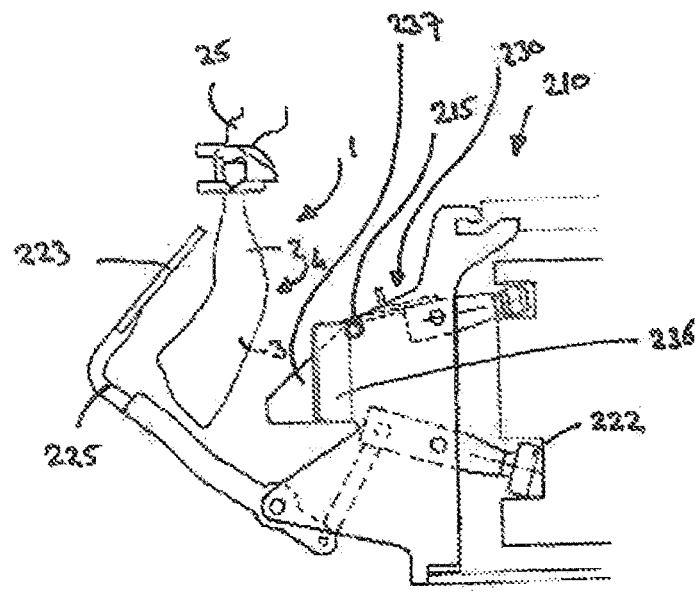

FIG. 26 shows the leg product 1 being suspended from the carrier 25 and arranged adjacent to the leg positioner device 210.

The knee positioner body 223 and the thigh stop 215 are now in the inactive position, and the leg product 1 is arranged between the thigh stop 215 and the knee positioner body 223.

The knee cap lifter 230 is in its lower position.

Figure 27:
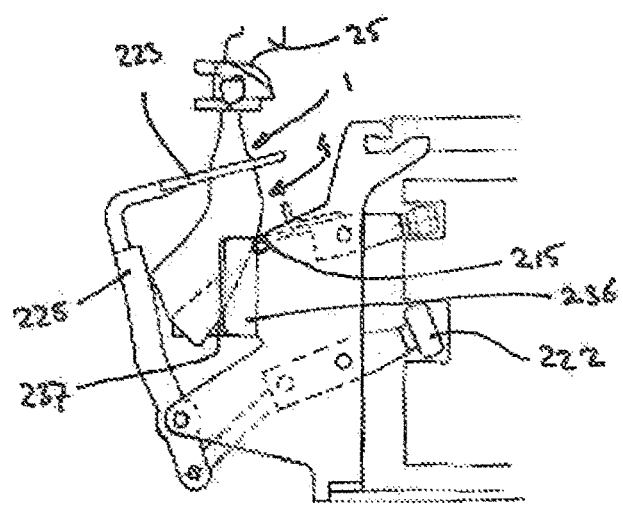

FIG. 27 shows a subsequent stage in the method in accordance with FIG. 26-31.

Now, the knee positioner body 233 is moved relative to the thigh stop 215 by the knee positioner arm 225, which is actuated by the cam roller 222. FIG. 27 shows a situation between the inactive position (FIG. 26) and the active position (FIG. 28).

In this stage of the method, the knee positioner body 223 engages the rear of the leg product 1. The thigh stop 215 comes into contact with the front of the leg product 1. The leg product 1 is now arranged between the first guide face 236 and the second guide face 237 of the run-in guide 235.

The knee cap lifter 230 is in its lower position.

Figure 28:
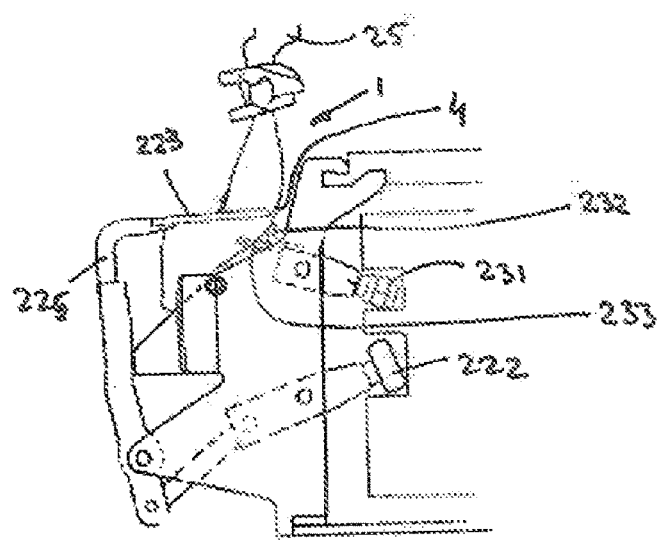

FIG. 28 shows a subsequent stage in the method in accordance with FIG. 26-31.

Now, the knee positioner body 233 and the thigh stop 215 are in the active position. As can be seen in FIG. 28, the knee positioner body 223 and the thigh stop 215 both engage the leg product 1, and their relative position is such that the leg product 1 is bent at the knee joint 4, and the knee joint 4 is in front of the thigh stop 215.

The relative position of the thigh stop 215 and the knee positioner body 223 in the active position makes that the leg product 1 has to bend at the knee 4. The relative movement of the thigh stop 215 and the knee positioner body 223 together with the possibility for the leg product 1 to rotate with or relative to the poultry product carrier 25, allows the leg product 1 to assume the bent position with the knee cap 23 facing away from the knee positioner body 223 even if the knee cap 23 did not face away from the knee positioner body 223 entirely when the leg product 1 entered the system of FIG. 26-31.

In the bent position as shown in FIG. 28, the front of the leg product is now engaged at the knee cap by the knee cap lifter 230 and lifted into the lifted position. To get the leg product 1 in the lifted position, the knee cap lifter is moved into its upper position (which is shown in FIG. 28). Cam roller 231 actuates the movement of the knee cap lifter 230.

The knee cap lifter 230 comprises a knee cap engager surface 232 and a thigh engager surface 233. The thigh engager surface 233 is adapted and arranged to engage front side of the thigh 3 when the leg product is in the bent position. The knee cap engager surface 232 engages the knee cap, preferably the lower side of the knee cap.

Figure 29:
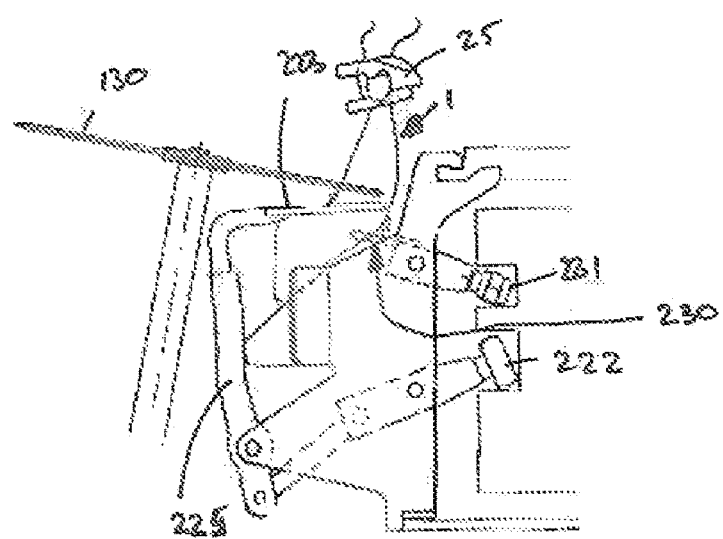

Optionally, before the knee cap lifter moves the leg product into the lifted position, the knee positioner body is returned to the position shown in FIG. 27, and then is moved again to the position shown in FIG. 28. It was found that by doing so, the leg product 1 comes into a bent position with the knee cap facing away from the knee positioner 210 in a reliable way In the situation shown in FIG. 28, the knee joint is now accurately positioned so that the transverse cut at the knee joint can be made. Knee cutter device 130 is provided to make this cut, which is shown in FIG. 29. The knee cutter device 130 for example comprises a circular cutting blade that is rotated about a shaft to make the cut. The thigh stop 215, knee positioner body 223 and knee lifter 230 hold the leg product in position when the transverse cut at the knee joint is made.

In a possible embodiment, the leg positioner devices 210 are arranged in a carrousel machine to move along a circular path. Optionally, in such an embodiment, the knee cutter device 130 is arranged relative to this circular path is a position that allows the knee cutter device 130 to make the transverse cut at the knee joint. Optionally, the knee cutter device 130 has an adjustable position, which can be adapted for changes or variations in the dimensions of the leg products 1 that are to be processed.

Figure 30:
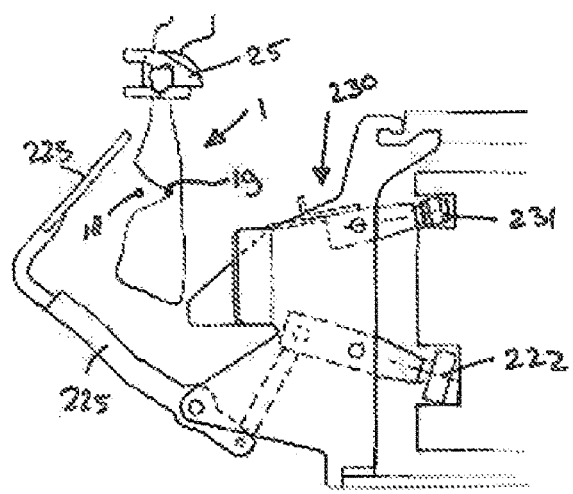

After the transverse cut 18 at the knee joint is made, the knee positioner body is returned to its initial position, the same that is shown in FIG. 26. The knee positioner body 223 and the thigh stop 215 are again in their inactive position. The knee cap lifter 230 is returned to its lower position. This is shown in FIG. 30.

Figure 31:
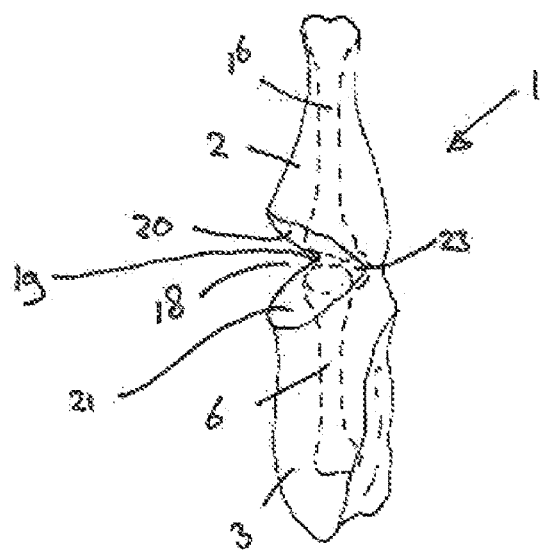

FIG. 31 shows the leg product with the transverse cut 18 at the knee joint that results from the method according to FIG. 26-31.

The transverse cut 18 is made from the rear side of the leg product 1 towards the knee cap 23. The transverse cut 18 extends generally in a direction transverse to the thigh bone 6 and the tibia bone 12. The transverse cut 18 has a cut end 19 which is located adjacent to the front of the leg product so that the thigh 3 and the drumstick 2 remain connected to each other. By the transverse cut 18 a drumstick side cut plane 20 and a thigh side cut plane 21 are created that are connected to each other adjacent to the cut end 19.

In a second aspect, the invention pertains to a system and method according to any of the following clauses:

Clauses:

1. System for making a knee cut in a defeathered whole leg poultry product, wherein the defeathered whole leg poultry product comprises:

a thigh, which thigh comprises at least a thigh bone and thigh meat, wherein the thigh bone has a knee side end and a hip side end, a drumstick, which drumstick comprises at least a tibia bone and drumstick meat, wherein the tibia bone has a knee side end and a tarsal joint side end, a knee joint, which knee joint comprises at least the knee cap and a connection between the thigh and the drumstick, which defeathered whole leg product has a front side, which is the side on which the knee cap is located, and a rear side, which is the side opposite to the front side, wherein the system comprises:

a poultry products conveyor comprising:

a track, a plurality of poultry product carriers which are spaced apart from one another in the direction of the track and which are movable along said track in a direction of conveyance, wherein each poultry product carrier is adapted to hold at least one defeathered whole leg poultry product at or adjacent to the tarsal joint side end thereof such that the defeathered whole leg poultry product is conveyed hanging from said poultry product carrier, wherein the poultry product carrier is adapted to allow rotation of the defeathered whole leg poultry product about the tibia bone of said defeathered whole leg poultry product and about an axis generally perpendicular to said tibia bone, a leg positioner device, which is adapted to position a single defeathered whole leg poultry product, which leg positioner device is arranged along the track of the poultry products conveyor, wherein said leg positioner device comprises:

a thigh stop, which is adapted and arranged to engage the thigh, a knee positioner having a knee positioner body, bringing said leg product into a bent position by moving the knee positioner and the thigh stop of said leg positioner device relative to each other from an inactive position to an active position, wherein during this motion from the inactive position to the active position, the knee positioner body and the thigh stop both engage the leg product, and in the active position, their relative position is such that the leg product has been bent at the knee joint, and the knee joint is in front of the thigh stop and wherein in the inactive position of the knee positioner body, the distance between the thigh stop and the knee positioner body and their relative position are such that the leg product can be arranged between the thigh stop and the knee positioner body while the leg product is suspended from the poultry product carrier,
- a knee cap lifter, which is adapted and arranged to engage the defeathered whole leg poultry product by the knee cap when the knee positioner and the thigh stop are in the active position and bend the defeathered whole leg poultry product, which knee cap lifter is moveable between a lower position and an upper position, in which lower position the knee cap lifter engages the knee cap while the defeathered whole leg poultry product is held in the bent position by the knee positioner and the thigh stop, and wherein in the upper position of the knee cap lifter, the defeathered whole leg poultry product is in a lifted position with the knee cap lifter supporting the defeathered whole leg poultry product at the knee cap,
- a knee cutter device, which knee cutter device is arranged along the track of the poultry products conveyor,
- wherein the knee cutter device is adapted and arranged to make a transverse cut at the knee joint of the defeathered whole leg poultry product when the deafeathered whole leg poultry product is in said lifted position, which transverse cut is made from the rear side of the defeathered whole leg poultry product towards the knee cap, which transverse cut extends generally in a direction transverse to the thigh bone and the tibia bone, said transverse cut having a cut end which is located adjacent to the front of the defeathered whole leg poultry product so that the thigh and the drumstick remain connected to each other, by which transverse cut a drumstick side cut plane and a thigh side cut plane are created.

2. System according to clause 1,
wherein the knee cap lifter comprises a knee cap engager surface and a thigh engager surface, which thigh engager surface extends under an angle relative to the knee cap engager surface, which thigh engager surface is adapted and arranged to engage front side of the thigh when the defeathered whole leg poultry product is in the bent position.

3. System according to any of the preceding clauses,
wherein the system further comprises a leg positioner controller for moving the knee positioner and thigh stop from the inactive position to the active position and vice versa.

4. System according to clause 3,
wherein the leg positioner controller is adapted to move the knee positioner and thigh stop from the inactive position to the active position, back from the active position to the inactive position and again from the inactive position to the active position upstream of the knee cutter device.

5. System according to any of the preceding clauses,
wherein the system further comprises a drumstick guide which is adapted and arranged to engage the drumstick in the first and/or lifted position of the defeathered whole leg poultry product,
which drumstick guide has a leg contact surface which is arranged at a horizontal offset from the thigh stop in the first horizontal direction.

6. System according to any of the preceding clauses,
wherein a plurality of the leg positioner devices is provided that are arranged in a carrousel machine, which carrousel machine has a vertical rotation axis about which the leg positioners are rotatable,
wherein the track of the poultry products conveyor has a curved section which has a radius of curvature and a center of curvature, which center of curvature coincides with the vertical rotation axis of the carrousel machine, and
wherein the product cutter is arranged adjacent to said curved section of the track at a horizontal distance from the vertical rotation axis of the carrousel machine that is larger than the radius of curvature of the curved track section.

7. System according to any of the preceding clauses,
wherein the poultry product carrier is adapted to allow rotation of the defeathered whole leg poultry product relative to said poultry product carrier.

8. System according to any of the preceding clauses,
wherein the knee positioner comprises a knee positioner body with an opening for receiving the defeathered whole leg poultry product, and a knee positioner arm onto which said knee positioner body is attached, which arm is pivotable about a knee positioner pivot.

9. System according to any of the preceding clauses,
wherein the leg positioner further comprises a run-in guide for pre-positioning the defeathered whole leg poultry part, which run-in guide comprises a first guide face and a second guide face, which both extend under a relative angle to each other and to the direction of conveyance of the defeathered whole leg poultry product.

10. System according to clause 9,
wherein the first guide face is located upstream in the direction of conveyance relative to the second guide face, and wherein the angle between the first guide face and the direction of conveyance is closer to 90° than the angle between the second guide face and the direction of conveyance.

11. Method for making a knee cut in a defeathered whole leg poultry product,
Which method comprises the following steps:
- providing a defeathered whole leg poultry product, which comprises:
  - a thigh, which thigh comprises at least a thigh bone and thigh meat, wherein the thigh bone has a knee side end and a hip side end,
  - a drumstick, which drumstick comprises at least a tibia bone and drumstick meat, wherein the tibia bone has a knee side end and a tarsal joint side end,
  - a knee joint, which knee joint comprises at least the knee cap and a connection between the thigh and the drumstick,
  - which defeathered whole leg product has a front side, which is the side on which the knee cap is located, and a rear side, which is the side opposite to the front side,
- arranging the defeathered whole leg poultry product in a poultry products conveyor comprising:
  - a track,
  - a plurality of poultry product carriers which are spaced apart from one another in the direction of the track and which are movable along said track in a direction of conveyance, wherein each poultry product carrier is adapted to hold at least one defeathered whole leg poultry product at or adjacent to the tarsal joint side end thereof such that the defeathered whole leg poultry product is conveyed hanging from said poultry product carrier, wherein the poultry product carrier is adapted to allow rotation of the defeathered whole leg poultry product about the tibia bone of said defeathered whole leg poultry product and about an axis generally perpendicular to said tibia bone, conveying the defeathered whole leg poultry product along said track in a direction of conveyance, with the defeathered whole leg poultry product being suspended from the carrier in which it is arranged, along which track a leg positioner device and a knee cutter device are arranged, wherein the leg positioner device comprises a knee positioner and a thigh stop, by using said leg positioner device, bringing said leg product into a bent position by moving the knee positioner and the thigh stop of said leg positioner device relative to each other from an inactive position to an active position, wherein during this motion from the inactive position to the active position, the knee positioner body and the thigh stop both engage the leg product, and in the active position, their relative position is such that the leg product has been bent at the knee joint, and the knee joint is in front of the thigh stop and wherein in the inactive position of the knee positioner body, the distance between the thigh stop and the knee positioner body and their relative position are such that the leg product can be arranged between the thigh stop and the knee positioner body while the leg product is suspended from the poultry product carrier, engaging the defeathered whole leg poultry product by the knee cap with a knee cap lifter when the knee positioner and the thigh stop are in the active position and the knee positioner and the thigh stop together bend the defeathered whole leg poultry product, and then moving the knee cap lifter from a lower position in which the knee cap lifter first engages the knee cap to an upper position, and wherein in the upper position of the knee cap lifter, the defeathered whole leg poultry product is in a lifted position with the knee cap lifter supporting the defeathered whole leg poultry product at the knee cap, making a transverse cut at the knee joint of the defeathered whole leg poultry product while the defeathered whole leg poultry product is in said lifted position by using a knee cutter device which is arranged along the track of the poultry products conveyor, which transverse cut is made from the rear side of the defeathered whole leg poultry product towards the knee cap, which transverse cut extends generally in a direction transverse to the thigh bone and the tibia bone, said transverse cut having a cut end which is located adjacent to the front of the defeathered whole leg poultry product so that the thigh and the drumstick remain connected to each other, by which transverse cut a drumstick side cut plane and a thigh side cut plane are created.

12. Method according to clause 11,
wherein the cut end of the transverse cut is located adjacent to the knee cap, on the rear side of the knee cap, so that the knee cap remains intact when the transverse cut is made.

13. Method according to any of the clauses 11-12,
wherein the knee positioner is moved from the inactive position to the active position, back from the active position to the inactive position and again from the inactive position to the active position before the transverse cut at the knee is made.

14. Method according to any of the clauses 11-13,
wherein the method is carried out in a carrousel machine, which carrousel machine has a central vertical rotation axis, wherein in the bent position and in the lifted position the front side of the defeathered whole leg poultry product faces towards said central vertical rotation axis.

15. Method according to any of the clauses 11-14,
wherein the knee positioner and the thigh stop engage the defeathered whole leg poultry product while the transverse cut in the knee joint is made.

16. Method according to any of the clauses 11-15,
wherein a drumstick guide is provided which engages the drumstick in the first and/or lifted position of the defeathered whole leg poultry product,
which drumstick guide has a leg contact surface which is arranged at a horizontal offset from the thigh stop in the first horizontal direction.

17. Method according to any of the clauses 11-16,
wherein the defeathered whole leg poultry product rotates about the tibia bone relative to the poultry product carrier when the knee positioner engages the defeathered whole leg poultry product during the movement of said knee positioner from the inactive position to the active position.

The invention claimed is:

1. A method for processing a defeathered whole leg poultry product, comprising the steps of:
providing a defeathered whole leg poultry product, the defeathered whole leg poultry product comprising:
a thigh, which thigh comprises at least a thigh bone and thigh meat, wherein the thigh bone has a knee side end and a hip side end;
a drumstick comprising at least a tibia bone and drumstick meat, wherein the tibia bone has a knee side end and a tarsal joint side end;
a knee joint comprising at least the knee cap, knee meat on said knee cap and a connection between the thigh and the drumstick, the defeathered whole leg poultry product having a front side, which is the side on which the knee cap is located, and a rear side, which is the side opposite to the front side;
arranging the defeathered whole leg poultry product in a poultry products conveyor comprising:
a track;
a plurality of poultry product carriers spaced apart from one another in the direction of the track and movable along said track, wherein each poultry product carrier is adapted to hold at least one defeathered whole leg poultry product at or adjacent to the tarsal joint side end thereof such that the defeathered whole leg poultry product is conveyed hanging from said poultry product carrier;
conveying the defeathered whole leg poultry product along said track in a direction of conveyance (DC), with the defeathered whole leg poultry product being suspended from the carrier in which the defeathered whole leg poultry product is arranged, along which track a knee cutter device, a thigh bone remover device and a thigh meat and knee meat harvester device are provided;
while the defeathered whole leg poultry product is suspended from the carrier, making a transverse cut at the knee joint using the knee cutter device, the transverse cut being made from the rear side of the defeathered whole leg poultry product towards the knee cap, the transverse cut extending generally in a direction transverse to the thigh bone and the tibia bone, said transverse cut having a cut end located adjacent to the rear side of the knee cap so that the thigh and the drumstick remain connected to each other and the knee cap remains intact, by which transverse cut a drumstick side cut plane and a thigh side cut plane are created;
while keeping the thigh meat and the drumstick connected to each other, removing the thigh bone from the thigh meat via the thigh side cut plane of the transverse cut in the knee joint by using the thigh bone remover device; and while keeping the thigh meat and the drumstick connected to each other, severing the knee meat from the knee cap while keeping the knee meat and the thigh meat connected to each other by using the thigh meat and knee meat harvester device, and subsequently severing the still interconnected knee meat and thigh meat from the drumstick.

2. The method according to claim 1, wherein the defeathered whole leg poultry product that is provided further comprises thigh skin and drumstick skin, and the method further comprises the step of removing thigh skin from the thigh in a thigh deskinner device, while keeping the drumstick skin on the drumstick.

3. The method according to claim 2, wherein the thigh skin is removed while the drumstick and thigh are still connected to each other but after the transverse cut at the knee is made.

4. The method according to claim 1, wherein the same poultry product carrier holds the defeathered whole leg poultry product when the transverse cut at the knee is made, when the thigh bone is removed and when the interconnected knee meat and thigh meat is severed from the drumstick of said defeathered whole leg poultry product.

5. The method according to claim 1, wherein the defeathered whole leg poultry product is positioned prior to making the transverse cut at the knee, for which positioning a leg positioner device is used that has a thigh stop and a knee positioner with a knee positioner body, which positioning comprises bringing said defeathered whole leg poultry product into a bent position by moving the knee positioner and the thigh stop of said leg positioner device relative to each other from an inactive position to an active position, wherein during the motion from the inactive position to the active position, the knee positioner body and the thigh stop both engage the defeathered whole leg poultry product, and in the active position, their relative position is such that the defeathered whole leg poultry product has been bent at the knee joint, and the knee joint is in front of the thigh stop.

6. The method according to claim 1, wherein the defeathered whole leg poultry product is positioned prior to making the transverse cut at the knee joint, which positioning comprises engaging the defeathered whole leg poultry product by the knee cap with a knee cap lifter, and then moving the knee cap lifter from a lower position in which the knee cap lifter first engages the knee cap to an upper position, and wherein in the upper position of the knee cap lifter, the defeathered whole leg poultry product is positioned relative to the knee cutter device in order for the knee cutter device to make the transverse cut, with the knee cap lifter supporting the defeathered whole leg poultry product at the knee cap.

7. The method according to claim 1, wherein after making a transverse cut at the knee joint and prior to removing the thigh bone from the thigh meat via the thigh side cut plane of the transverse cut in the knee joint the method further comprises the step of:

while keeping the thigh and the drumstick connected to each other, changing the angle between the thigh and the drumstick by bending the defeathered whole leg poultry product at the knee joint and thereby opening the transverse cut at the knee joint and exposing the thigh side cut plane, during which bending the thigh meat remains on the thigh bone and the drumstick meat remains on the tibia bone.

8. The method according to claim 7, wherein the thigh bone further comprises a knee side condyle, and wherein the step of removing the thigh bone from the thigh meat via the thigh side cut plane of the transverse cut at the knee joint comprises:

arranging a resilient scraper member comprising a central aperture adjacent to the thigh side cut plane of the transverse cut at the knee joint;

forcing the knee side condyle through said central aperture by exerting a pushing force on the thigh bone, optionally on the hip side end of the thigh bone, thereby severing thigh meat from the knee side condyle of the thigh bone;

engaging the thigh bone just behind the knee side condyle with a puller;

while exerting a pulling force on the thigh bone by the puller, scraping the thigh meat from a region of the thigh bone between the knee side condyle and the hip side end using a scraper, wherein the thigh meat is scraped from the thigh bone in a scraping direction from the knee side end towards the hip side end of the thigh bone; and cutting through any remaining tissue connections between the hip side end of the thigh bone and the thigh meat.

9. The method according to claim 8, wherein the scraper that scrapes the thigh meat from the region of the thigh bone between the knee side condyle and the hip side end is activated by the knee side condyle.

10. The method according to claim 1, wherein the step of severing the knee meat from the knee cap while keeping the knee meat and the thigh meat connected to each other, and subsequently severing the still interconnected knee meat and thigh meat from the drumstick comprises the following steps:

providing a knee meat scraper device, the knee meat scraper device comprising a knee cap scraper and a counter element, the knee meat scraper device having a open state and a closed state, wherein in the open state the knee cap scraper and the counter element are spaced apart from each other, so as to allow the knee joint of the defeathered whole leg poultry product to be introduced between the knee cap scraper and the counter element; while the defeathered whole leg poultry product is suspended from said poultry product carrier and the knee meat scraper device is in the open state, arranging the defeathered whole leg poultry product adjacent to the counter element, with the drumstick side cut plane facing the counter element;

bringing the knee meat scraper device in a closed state in which the knee cap scraper engages the defeathered whole leg poultry product at the front side adjacent to the knee cap on the drumstick side of said knee cap and in which the counter element engages the defeathered whole leg poultry product at or adjacent to the rear side of the knee cap;

performing a scraping step in which the drumstick and the knee cap scraper are moved away from each other, thereby moving the knee cap past the knee cap scraper while the counter element engages the defeathered whole leg poultry product at or adjacent to the rear side of the knee cap, therewith scraping the knee meat from the knee cap while leaving the knee meat connected to the thigh, so that after the scraping step the knee meat and thigh meat are present on a first side of the knee cap scraper and the knee cap is present on a second side of the knee cap scraper.

11. The method according to claim 10, wherein the drumstick is supported by a drumstick support element when the drumstick and the knee meat scraper device are being moved away from each other, the drumstick support element engaging the drumstick at the drumstick side cut plane.

12. The method according to claim 10, wherein the scraped knee cap is severed from the drumstick by cutting at a first cutting location which is situated between the knee cap and the drumstick.

13. The method according to claim 10, wherein the knee cap is severed from the thigh and the knee meat by cutting at a second cutting location situated between the knee cap and the thigh, adjacent to the knee cap scraper, during which severing the knee meat and the thigh remain interconnected.

14. A system for processing a defeathered whole leg poultry product, the defeathered whole leg poultry product comprising:
   a thigh comprisign at least a thigh bone and thigh meat, wherein the thigh bone has a knee side end and a hip side end;
   a drumstick comprising at least a tibia bone and drumstick meat, wherein the tibia bone has a knee side end and a tarsal joint side end;
   a knee joint comprising at least the knee cap, knee meat on said knee cap and a connection between the thigh and the drumstick, the defeathered whole leg poultry product having a front side on which the knee cap is located, and a rear side opposite to the front side,
   wherein the system comprises:
   a poultry products conveyor comprising:
      a track;
      a plurality of poultry product carriers spaced apart from one another in the direction of the track and are movable along said track, wherein each poultry product carrier is adapted to hold at least one defeathered whole leg poultry product at or adjacent to the tarsal joint side end thereof such that the defeathered whole leg poultry product is conveyed hanging from said poultry product carrier; and
      a knee cutter device arranged along the track of the poultry products conveyor;
   wherein the knee cutter device is adapted and arranged to make a transverse cut at the knee joint while the defeathered whole leg poultry product is suspended from the poultry product carrier the transverse cut being made from the rear side of the defeathered whole leg poultry product towards the knee cap the transverse cut extending generally in a direction transverse to the thigh bone and the tibia bone, said transverse cut having a cut end located adjacent to the rear side of the knee cap so that the thigh and the drumstick remain connected to each other and the knee cap remains intact, by which transverse cut a drumstick side cut plane and a thigh side cut plane are created;
      a thigh bone remover device arranged along the track of the poultry products conveyor, downstream of the knee cutter device the thigh bone remover device being adapted to remove the thigh bone from the thigh meat via the thigh side cut plane of the transverse cut in the knee joint while keeping the thigh and the drumstick connected to each other; and
      a thigh meat and knee meat harvester device arranged along the track, the thigh meat and knee meat harvester device being adapted to sever the knee meat from the knee cap while keeping the knee meat and the thigh meat connected to each other, and to subsequently severe the still interconnected knee meat and thigh meat from the drumstick.

15. The system according to claim 14, wherein the defeathered whole leg poultry product that is provided further comprises thigh skin and drumstick skin, and
   wherein the system further comprises a thigh deskinner device arranged along the track of the poultry products conveyor, downstream of the knee cutter device, the thigh deskinner device being adapted to remove the thigh skin from the thigh while keeping the drumstick skin attached to the drumstick.

16. The system according to claim 14, wherein the system further comprises a leg positioner device adapted to position a single defeathered whole leg poultry product, the leg positioner device being arranged along the track of the poultry products conveyor, wherein said leg positioner device comprises:
   a thigh stop adapted and arranged to engage the thigh; and
   a knee positioner having a knee positioner body, bringing said defeathered whole leg poultry product into a bent position by moving the knee positioner and the thigh stop of said leg positioner device relative to each other from an inactive position to an active position, wherein during this motion from the inactive position to the active position, the knee positioner body and the thigh stop both engage the defeathered whole leg poultry product, and in the active position, their relative position is such that the defeathered whole leg poultry product has been bent at the knee joint, and the knee joint is in front of the thigh stop and wherein in the inactive position of the knee positioner body, the distance between the thigh stop and the knee positioner body and their relative position are such that the defeathered whole leg poultry product can be arranged between the thigh stop and the knee positioner body while the defeathered whole leg poultry product is suspended from the poultry product carrier.

17. The system according to claim 14, wherein the system further comprises a knee cap lifter adapted and arranged to engage the defeathered whole leg poultry product by the knee cap, and
   wherein the knee cap lifter is moveable between a lower position and an upper position, in which lower position the knee cap lifter engages the knee cap, and wherein in the upper position of the knee cap lifter, the defeathered whole leg poultry product is positioned relative to the knee cutter device in order for the knee cutter device to make the transverse cut, with the knee cap lifter supporting the defeathered whole leg poultry product at the knee cap.

18. The system according to claim 14, wherein the thigh bone further comprises a knee side condyle and wherein the thigh bone remover device comprises:
   a bender device adapted to engage the defeathered whole leg poultry product and bend the defeathered whole leg poultry product at the knee joint to a bent position, during which bending the thigh meat remains on the thigh bone and the drumstick meat remains on the tibia bone, by said bending changing the angle between the thigh and the drumstick, opening the transverse cut at the knee joint and exposing the thigh side cut plane while keeping the thigh and the drumstick connected to each other, which bender device is further adapted to keep the defeathered whole leg poultry product in the bent position;
   a resilient scraper member having a central aperture the resilient scraper member being arrangeable adjacent to the thigh side cut plane of the transverse cut at the knee joint the central aperture having a diameter that is variable between a minimum diameter and a maximum diameter, wherein the minimum diameter is smaller than the maximum diameter of a knee side condyle of the thigh bone, and wherein the central aperture is biased towards its minimum diameter; and a thigh bone displacement assembly that is adapted to force the thigh bone through the central aperture while the transverse cut at the knee joint is kept open and the thigh and the drumstick are kept connected to each other, thereby severing thigh meat from the thigh bone.

19. The system according to claim 18, wherein the minimum diameter of the central aperture is larger than the thickness of the thigh bone in the region between the knee side condyle and the hip side condyle if the thigh bone comprises a hip side condyle or the hip side end if the thigh bone does not comprise a hip side condyle.

20. The system according to claim 18, wherein the thigh bone remover assembly comprises:
   a scraper adapted to scrape the thigh meat from the thigh bone in a region between the knee side condyle and the hip side end, in the direction from the knee side end towards the hip side end; and
   a puller adapted to exert a pulling force on the thigh bone in order to move the thigh bone relative to the scraper.

21. The system according to claim 20, wherein the thigh bone remover assembly comprises a scraper activator the scraper activator being adapted to be operated by the knee side condyle of the thigh bone.

22. The system according to claim 14, wherein the knee meat and thigh meat harvester remover module comprises:
   a knee meat scraper device comprising:
      a knee cap scraper; and
      a counter element arranged at a distance from the track of the poultry products conveyor that enables to arrange the defeathered whole leg poultry product adjacent to the counter element, with the drumstick side cut plane facing the counter element, while the defeathered whole leg poultry product is suspended from said poultry product carrier,
   wherein the knee meat scraper device has an open state and a closed state, wherein in the open state the knee cap scraper and the counter element are spaced apart from each other, allowing the knee joint of the defeathered whole leg poultry product to be introduced between the knee cap scraper and the counter element, and wherein in the closed state the knee cap scraper engages the front of the defeathered whole leg poultry product at or adjacent the knee cap on the drumstick side of said knee cap and the counter element engages the defeathered whole leg poultry product at or adjacent the rear of the knee cap in order to allow scraping of the knee meat from the knee cap;
   a scraping motion device adapted to provoke a relative movement of the drumstick and the knee cap scraper away from each other, thereby moving the knee cap past the knee cap scraper while the counter element engages the defeathered whole leg poultry product at or adjacent to the rear side of the knee cap, thereby inducing the scraping of the knee meat from the knee cap while leaving the knee meat connected to the thigh, wherein after the scraping the knee meat and thigh meat are present on a first side of the knee cap scraper and the knee cap on a second side of the knee cap scraper.

23. The system according to claim 22, wherein the knee meat and thigh meat harvester device further comprises a drumstick support element adapted to support the drumstick when the drumstick and the knee meat scraper device are being moved away from each other, the drumstick support element being arranged and adapted to engage the drumstick at the drumstick side cut plane.

24. The system according to claim 22, wherein the knee meat and thigh meat harvester remover module further comprises a drumstick knee cap separator adapted and arranged to sever the knee cap from the drumstick after the knee meat has been scraped off the knee the drumstick—knee cap separator being adapted and arranged to make a cut at a first cutting location situated between the knee cap and the drumstick.

25. The system according to claim 22, wherein the knee meat and thigh meat harvester remover module further comprises a knee cap—thigh separator adapted and arranged to sever the knee cap from the thigh and the knee meat after the knee meat has been scraped from the knee cap the knee cap—thigh separator being adapted and arranged to make a cut at a second cutting location situated between the knee cap and the thigh, adjacent to the knee cap scraper, during which severing the knee meat and the thigh remain interconnected.

* * * * *